(12) United States Patent
Ryu et al.

(10) Patent No.: US 12,176,989 B2
(45) Date of Patent: Dec. 24, 2024

(54) TRANSMITTING INTER-USER-EQUIPMENT COORDINATION INFORMATION BASED AT LEAST IN PART ON BEAMFORMING

(71) Applicant: QUALCOMM Incorporated, San Diego, CA (US)

(72) Inventors: Jung Ho Ryu, Fort Lee, NJ (US); Sony Akkarakaran, Poway, CA (US); Sourjya Dutta, San Diego, CA (US); Gabi Sarkis, San Diego, CA (US); Hua Wang, Basking Ridge, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/815,870

(22) Filed: Jul. 28, 2022

(65) Prior Publication Data

US 2024/0039605 A1   Feb. 1, 2024

(51) Int. Cl.
*H04B 7/06* (2006.01)
*H04W 28/26* (2009.01)
*H04W 72/044* (2023.01)
*H04W 72/0446* (2023.01)

(52) U.S. Cl.
CPC .......... *H04B 7/0695* (2013.01); *H04W 28/26* (2013.01); *H04W 72/0446* (2013.01); *H04W 72/046* (2013.01)

(58) Field of Classification Search
CPC .......... H04B 7/04; H04B 7/06; H04B 7/0686; H04B 7/0695; H04B 7/06952; H04B 7/06954; H04B 7/0696; H04B 7/06968; H04W 28/26; H04W 72/0446;
(Continued)

(56) References Cited

U.S. PATENT DOCUMENTS 10,367,677 B2 *   7/2019   Parkvall .............. H04L 41/0233
10,938,733 B2 *   3/2021   Ganesan .............. H04L 1/1893
11,229,042 B2 *   1/2022   Ganesan ................. H04L 1/08
(Continued)

FOREIGN PATENT DOCUMENTS

WO   2021207459 A1   10/2021
WO   2022084974 A1   4/2022

OTHER PUBLICATIONS

International Search Report and Written Opinion—PCT/US2023/069578—ISA/EPO—Oct. 11, 2023.

*Primary Examiner* — James M Perez
(74) *Attorney, Agent, or Firm* — Harrity & Harrity LLP/Qualcomm Incorporated

(57) ABSTRACT

Various aspects of the present disclosure generally relate to wireless communication. In some aspects, a first user equipment (UE) may receive, from a second UE and via a receive beam of the first UE, an inter-UE coordination (IUC) request, wherein the IUC request is based at least in part on a transmit beam of the second UE that is associated with an intended transmission of the second UE. The UE may transmit, to the second UE, IUC information that indicates preferred resources or non-preferred resources for the intended transmission, wherein the IUC information is based at least in part on a channel sensing by the first UE. Numerous other aspects are described.

30 Claims, 18 Drawing Sheets

(58) Field of Classification Search
CPC ... H04W 72/046; H04W 72/20; H04W 72/25; H04W 72/40

See application file for complete search history.

(56) References Cited

U.S. PATENT DOCUMENTS

| | | | |
|---|---|---|---|
| 11,297,610 B2* | 4/2022 | Basu Mallick | H04W 72/1273 |
| 11,304,077 B2* | 4/2022 | Bagheri | H04W 72/0446 |
| 11,363,602 B2* | 6/2022 | Luo | H04W 24/04 |
| 11,375,350 B2* | 6/2022 | Basu Mallick | H04L 1/1829 |
| 11,425,775 B2* | 8/2022 | Ganesan | H04W 76/14 |
| 11,445,387 B2* | 9/2022 | Bagheri | H04L 5/0044 |
| 11,452,120 B2* | 9/2022 | Ganesan | H04W 72/54 |
| 11,477,705 B2* | 10/2022 | Basu Mallick | H04L 69/28 |
| 11,540,106 B2* | 12/2022 | Vargas | H04W 16/28 |
| 11,588,746 B2* | 2/2023 | Ganesan | H04L 1/1874 |
| 11,638,263 B2* | 4/2023 | Ryu | H04W 72/20 370/252 |
| 11,683,822 B2* | 6/2023 | Ganesan | H04W 4/06 370/329 |
| 11,690,056 B2* | 6/2023 | Luo | H04W 72/02 370/329 |
| 11,706,764 B2* | 7/2023 | Ryu | H04W 76/14 370/329 |
| 11,765,745 B2* | 9/2023 | Basu Mallick | H04W 72/0446 370/336 |
| 11,777,583 B2* | 10/2023 | Dutta | H04B 7/0617 370/329 |
| 11,844,067 B2* | 12/2023 | Ibrahim | H04W 72/0446 |
| 11,877,146 B2* | 1/2024 | Dutta | H04B 7/0695 |
| 11,916,726 B2* | 2/2024 | Ryu | H04L 1/1893 |
| 11,923,946 B2* | 3/2024 | Wang | H04B 7/0695 |
| 11,950,235 B2* | 4/2024 | Ryu | H04W 76/14 |
| 2016/0066337 A1* | 3/2016 | Sartori | H04W 76/14 370/329 |
| 2016/0073408 A1* | 3/2016 | Sartori | H04W 72/0453 370/329 |
| 2017/0331670 A1* | 11/2017 | Parkvall | H04W 52/0229 |
| 2018/0206176 A1* | 7/2018 | Panteleev | H04W 72/20 |
| 2019/0281587 A1* | 9/2019 | Zhang | H04W 72/23 |
| 2019/0281588 A1* | 9/2019 | Zhang | H04B 7/0617 |
| 2019/0349901 A1* | 11/2019 | Basu Mallick | H04L 5/0048 |
| 2019/0372647 A1* | 12/2019 | Su | H04B 7/06954 |
| 2020/0008230 A1* | 1/2020 | Yu | H04L 5/0055 |
| 2020/0053580 A1* | 2/2020 | Bagheri | H04L 5/0053 |
| 2020/0053757 A1* | 2/2020 | Bagheri | H04L 5/0058 |
| 2020/0252990 A1* | 8/2020 | Ganesan | H04W 76/14 |
| 2020/0260472 A1* | 8/2020 | Ganesan | H04W 4/46 |
| 2020/0280362 A1* | 9/2020 | Garcia | H04B 7/0617 |
| 2020/0305174 A1* | 9/2020 | Ganesan | H04W 72/12 |
| 2020/0322774 A1* | 10/2020 | Vargas | H04W 4/023 |
| 2020/0336253 A1* | 10/2020 | He | H04W 76/14 |
| 2020/0336872 A1* | 10/2020 | Basu Mallick | H04W 4/40 |
| 2020/0404665 A1* | 12/2020 | Ryu | H04W 24/10 |
| 2020/0413393 A1* | 12/2020 | Luo | H04W 24/04 |
| 2021/0021536 A1* | 1/2021 | Ganesan | H04L 1/1893 |
| 2021/0058833 A1* | 2/2021 | Basu Mallick | H04W 36/0055 |
| 2021/0100059 A1* | 4/2021 | Xu | H04B 7/06954 |
| 2021/0135742 A1* | 5/2021 | Garcia | H04B 7/0452 |
| 2021/0184984 A1* | 6/2021 | Ganesan | H04L 47/56 |
| 2021/0219268 A1* | 7/2021 | Li | H04B 17/318 |
| 2022/0006688 A1* | 1/2022 | Ryu | H04L 1/1812 |
| 2022/0039076 A1* | 2/2022 | Choi | H04B 7/0695 |
| 2022/0070025 A1* | 3/2022 | Ko | H04L 25/0204 |
| 2022/0095235 A1* | 3/2022 | Zhang | H04W 52/028 |
| 2022/0116129 A1* | 4/2022 | Ying | H04B 7/0617 |
| 2022/0167330 A1* | 5/2022 | Ryu | H04W 72/20 |
| 2022/0167376 A1* | 5/2022 | Ryu | H04W 72/02 |
| 2022/0174655 A1* | 6/2022 | Tsai | H04W 72/20 |
| 2022/0201664 A1* | 6/2022 | Basu Mallick | H04W 72/23 |
| 2022/0209842 A1* | 6/2022 | Dutta | H04W 24/10 |
| 2022/0272555 A1* | 8/2022 | Bagheri | H04L 5/10 |
| 2022/0279499 A1* | 9/2022 | Luo | H04W 72/02 |
| 2022/0287093 A1* | 9/2022 | Iyer | H04B 7/0695 |
| 2022/0329992 A1* | 10/2022 | Basu Mallick | H04W 4/029 |
| 2022/0345261 A1* | 10/2022 | Ali | H04L 27/2636 |
| 2022/0346175 A1* | 10/2022 | Ganesan | H04B 7/0695 |
| 2022/0377810 A1* | 11/2022 | Bhamri | H04B 7/06966 |
| 2022/0385349 A1* | 12/2022 | Wang | H04B 7/0695 |
| 2022/0399927 A1* | 12/2022 | Tsai | H04B 7/0617 |
| 2022/0400462 A1* | 12/2022 | Dai | H04B 7/04013 |
| 2022/0417950 A1* | 12/2022 | Ganesan | H04W 4/029 |
| 2023/0007519 A1* | 1/2023 | Bagheri | H04L 5/0007 |
| 2023/0022915 A1* | 1/2023 | Bhamri | H04B 7/0408 |
| 2023/0080625 A1* | 3/2023 | Dutta | H04B 7/0695 370/329 |
| 2023/0109947 A1* | 4/2023 | Parkvall | H04W 52/0274 455/418 |
| 2023/0122993 A1* | 4/2023 | Vargas | H04B 7/06954 370/329 |
| 2023/0163868 A1* | 5/2023 | Zhang | H04B 7/063 370/252 |
| 2023/0171199 A1* | 6/2023 | Ganesan | H04L 1/08 370/315 |
| 2023/0171738 A1* | 6/2023 | Di Girolamo | H04W 72/20 370/329 |
| 2023/0180264 A1* | 6/2023 | Kim | H04B 7/0695 455/414.1 |
| 2023/0188960 A1* | 6/2023 | Kumari | H04B 17/3912 370/310 |
| 2023/0209579 A1* | 6/2023 | Ryu | H04W 72/20 370/252 |
| 2023/0224931 A1* | 7/2023 | Kim | H04W 56/002 370/329 |
| 2023/0232183 A1* | 7/2023 | Dai | G01S 13/003 455/456.1 |
| 2023/0276481 A1* | 8/2023 | Xue | H04L 5/0094 370/329 |
| 2023/0292300 A1* | 9/2023 | Kim | H04W 72/02 |
| 2023/0292348 A1* | 9/2023 | Kim | H04W 72/044 |
| 2023/0299836 A1* | 9/2023 | Zhou | H04W 16/28 370/329 |
| 2023/0319758 A1* | 10/2023 | Dai | H04W 64/00 455/456.1 |
| 2023/0319826 A1* | 10/2023 | Ryu | H04W 72/542 370/329 |
| 2023/0345204 A1* | 10/2023 | Dai | H04W 4/029 |
| 2023/0361955 A1* | 11/2023 | Ganesan | H04B 7/06966 |
| 2023/0362898 A1* | 11/2023 | Jeon | H04W 72/0453 |
| 2023/0388815 A1* | 11/2023 | Jeon | H04B 17/336 |
| 2023/0389046 A1* | 11/2023 | Kim | H04W 4/90 |
| 2023/0389051 A1* | 11/2023 | Leon Calvo | H04W 72/25 |
| 2023/0397034 A1* | 12/2023 | Ko | H04W 76/28 |
| 2023/0397103 A1* | 12/2023 | Elshafie | H04W 52/0229 |
| 2023/0397174 A1* | 12/2023 | Sun | H04W 72/25 |
| 2023/0403707 A1* | 12/2023 | Wu | H04W 72/20 |
| 2023/0403728 A1* | 12/2023 | Hwang | H04W 4/40 |
| 2023/0412234 A1* | 12/2023 | Zhou | H04W 76/19 |
| 2023/0413086 A1* | 12/2023 | Bagheri | H04L 5/0058 |
| 2024/0039605 A1* | 2/2024 | Ryu | H04W 72/0446 |
| 2024/0040614 A1* | 2/2024 | Ryu | H04W 16/28 |
| 2024/0056233 A1* | 2/2024 | Kim | H04L 5/00 |
| 2024/0073659 A1* | 2/2024 | Kumari | H04W 24/10 |
| 2024/0098519 A1* | 3/2024 | Dutta | H04W 16/28 |
| 2024/0114353 A1* | 4/2024 | Li | H04W 76/14 |

* cited by examiner

TRANSMITTING INTER-USER-EQUIPMENT COORDINATION INFORMATION BASED AT LEAST IN PART ON BEAMFORMING

FIELD OF THE DISCLOSURE

Aspects of the present disclosure generally relate to wireless communication and to techniques and apparatuses for transmitting inter-user-equipment (UE) coordination (IUC) information based at least in part on beamforming.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a first user equipment (UE) includes a memory and one or more processors, coupled to the memory, configured to: receive, from a second UE and via a receive (Rx) beam of the first UE, an inter-UE coordination (IUC) request, wherein the IUC request is based at least in part on a transmit (Tx) beam of the second UE that is associated with an intended transmission of the second UE; and transmit, to the second UE, IUC information that indicates preferred resources or non-preferred resources for the intended transmission, wherein the IUC information is based at least in part on a channel sensing by the first UE.

In some implementations, an apparatus for wireless communication at a second UE includes a memory and one or more processors, coupled to the memory, configured to: transmit, to a first UE, an IUC request using a Tx beam of the second UE that is associated with an intended transmission of the second UE; receive, from the first UE and based at least in part on the IUC request, IUC information that indicates preferred resources or non-preferred resources for the intended transmission, wherein the IUC information is based at least in part on a channel sensing by the first UE; and transmit, based at least in part on the IUC information, the intended transmission using the Tx beam of the second UE.

In some implementations, a method of wireless communication performed by a first UE includes receiving, from a second UE and via an Rx beam of the first UE, an IUC request, wherein the IUC request is based at least in part on a Tx beam of the second UE that is associated with an intended transmission of the second UE; and transmitting, to the second UE, IUC information that indicates preferred resources or non-preferred resources for the intended transmission, wherein the IUC information is based at least in part on a channel sensing by the first UE.

In some implementations, a method of wireless communication performed by a second UE includes transmitting, to a first UE, an IUC request using a Tx beam of the second UE that is associated with an intended transmission of the second UE; receiving, from the first UE and based at least in part on the IUC request, IUC information that indicates preferred resources or non-preferred resources for the intended transmission, wherein the IUC information is based at least in part on a channel sensing by the first UE; and transmitting, based at least in part on the IUC information, the intended transmission using the Tx beam of the second UE.

In some implementations, a non-transitory computer-readable medium storing a set of instructions for wireless communication includes one or more instructions that, when executed by one or more processors of a first UE, cause the first UE to: receive, from a second UE and via an Rx beam of the first UE, an IUC request, wherein the IUC request is based at least in part on a Tx beam of the second UE that is associated with an intended transmission of the second UE; and transmit, to the second UE, IUC information that indicates preferred resources or non-preferred resources for the intended transmission, wherein the IUC information is based at least in part on a channel sensing by the first UE.

In some implementations, a non-transitory computer-readable medium storing a set of instructions for wireless communication includes one or more instructions that, when executed by one or more processors of a second UE, cause the second UE to: transmit, to a first UE, an IUC request using a Tx beam of the second UE that is associated with an intended transmission of the second UE; receive, from the first UE and based at least in part on the IUC request, IUC information that indicates preferred resources or non-preferred resources for the intended transmission, wherein the IUC information is based at least in part on a channel sensing by the first UE; and transmit, based at least in part on the IUC information, the intended transmission using the Tx beam of the second UE.

In some implementations, a first apparatus for wireless communication includes means for receiving, from a second apparatus and via an Rx beam of the first apparatus, an IUC request, wherein the IUC request is based at least in part on a Tx beam of the second apparatus that is associated with an intended transmission of the second apparatus; and means for transmitting, to the second apparatus, IUC information that indicates preferred resources or non-preferred resources for the intended transmission, wherein the IUC information is based at least in part on a channel sensing by the first apparatus.

In some implementations, a second apparatus for wireless communication includes means for transmitting, to a first apparatus, an IUC request using a Tx beam of the second apparatus that is associated with an intended transmission of the second apparatus; means for receiving, from the first apparatus and based at least in part on the IUC request, IUC information that indicates preferred resources or non-preferred resources for the intended transmission, wherein the IUC information is based at least in part on a channel sensing by the first apparatus; and means for transmitting, based at least in part on the IUC information, the intended transmission using the Tx beam of the second apparatus.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
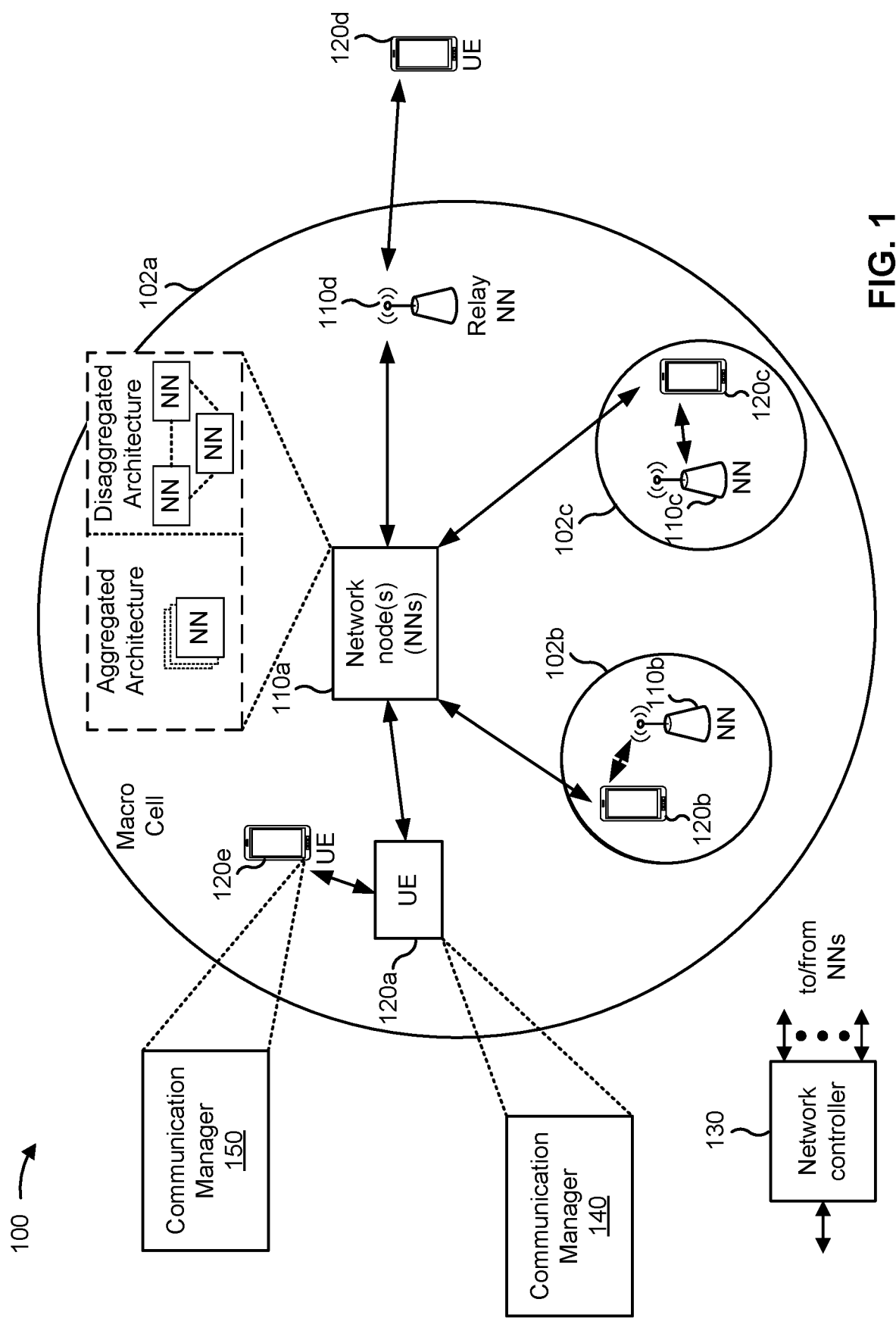
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LIE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., UE 120a) may include a communication manager 140. As described in more detail elsewhere herein, the communication manager 140 may receive, from a second UE and via a receive (Rx) beam of the first UE, an inter-UE coordination (IUC) request, wherein the IUC request is based at least in part on a transmit (Tx) beam of the second UE that is associated with an intended transmission of the second UE; and transmit, to the second UE, IUC information that indicates preferred resources or non-preferred resources for the intended transmission, wherein the IUC information is based at least in part on a channel sensing by the first UE. Additionally, or alternatively, the communication manager 140 may perform one or more other operations described herein.

In some aspects, a second UE (e.g., UE 120e) may include a communication manager 150. As described in more detail elsewhere herein, the communication manager 150 may transmit, to a first UE, an IUC request using a Tx beam of the second UE that is associated with an intended transmission of the second UE; receive, from the first UE and based at least in part on the IUC request, IUC information that indicates preferred resources or non-preferred resources for the intended transmission, wherein the IUC information is based at least in part on a channel sensing by the first UE; and transmit, based at least in part on the IUC information, the intended transmission using the Tx beam of the second UE. Additionally, or alternatively, the communication manager 150 may perform one or more other operations described herein.

As indicated above, FIG. 1 is provided as an example. Other examples may differ from what is described with regard to FIG. 1.

Figure 2:
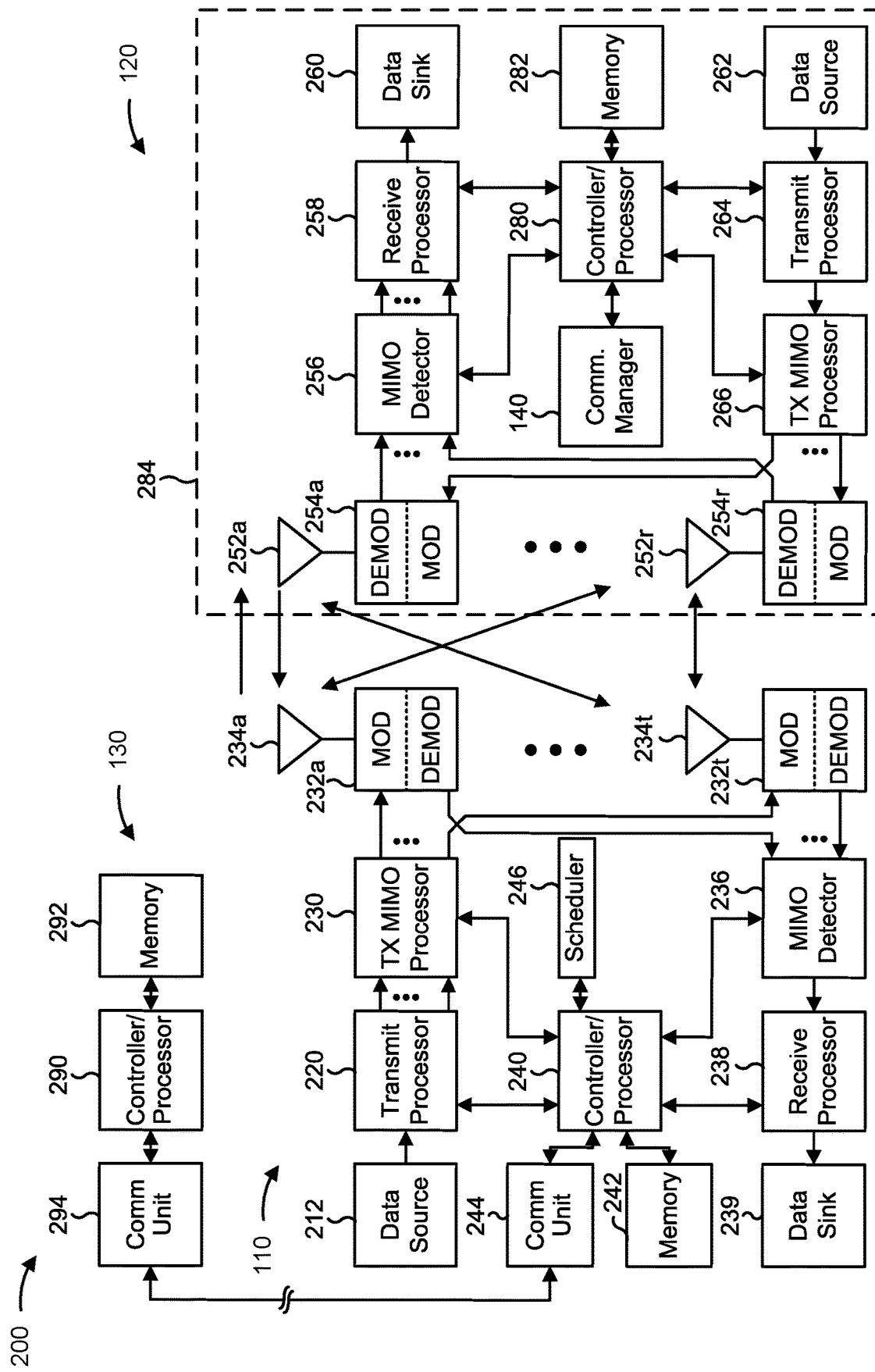
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 13-18).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 13-18).

The controller/processor 240 of the network node 110, the controller/processor 280 of the UE 120, and/or any other component(s) of FIG. 2 may perform one or more techniques associated with transmitting IUC information based at least in part on beamforming, as described in more detail elsewhere herein. For example, the controller/processor 240 of the network node 110, the controller/processor 280 of the UE 120, and/or any other component(s) of FIG. 2 may perform or direct operations of, for example, process 1500 of FIG. 15, process 1600 of FIG. 16, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1500 of FIG. 15, process 1600 of FIG. 16, and/or other processes as described herein. In some examples, executing instructions may include running the instructions, converting the instructions, compiling the instructions, and/or interpreting the instructions, among other examples.

In some aspects, a first UE (e.g., UE 120*a*) includes means for receiving, from a second UE and via an Rx beam of the first UE, an IUC request, wherein the IUC request is based at least in part on a Tx beam of the second UE that is associated with an intended transmission of the second UE (e.g., using antenna 252, modem 254, MIMO detector 256, receive processor 258, controller/processor 280, memory 282, or the like); and/or means for transmitting, to the second UE, IUC information that indicates preferred resources or non-preferred resources for the intended transmission, wherein the IUC information is based at least in part on a channel sensing by the first UE (e.g., using controller/processor 280, transmit processor 264, TX MIMO processor 266, modem 254, antenna 252, memory 282, or the like). The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., UE 120*e*) includes means for transmitting, to a first UE, an IUC request using a Tx beam that is associated with an intended transmission of the second UE (e.g., using controller/processor 280, transmit processor 264, TX MIMO processor 266, modem 254, antenna 252, memory 282, or the like); means for receiving, from the first UE and based at least in part on the IUC request, IUC information that indicates preferred resources or non-preferred resources for the intended transmission, wherein the IUC information is based at least in part on a channel sensing by the first UE using an Rx beam associated with the Tx beam (e.g., using antenna 252, modem 254, MIMO detector 256, receive processor 258, controller/processor 280, memory 282, or the like); and/or means for transmitting, to a third UE and based at least in part on the IUC information, the intended transmission using the Tx beam (e.g., using controller/processor 280, transmit processor 264, TX MIMO processor 266, modem 254, antenna 252, memory 282, or the like). The means for the second UE to perform operations described herein may include, for example, one or more of communication manager 150, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
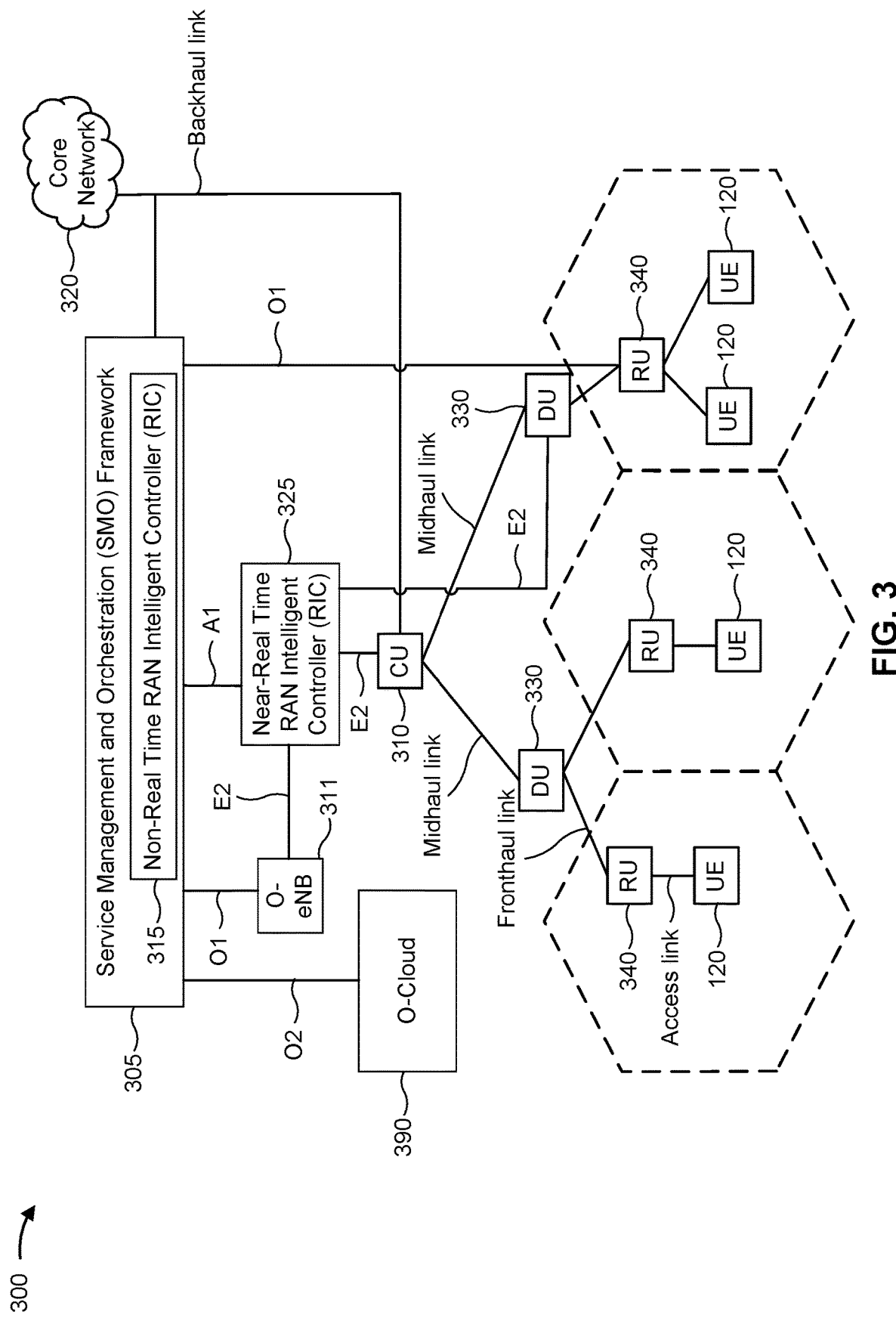
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A sidelink channel may have two modes of operation. In a first mode, a network node may manage sidelink resources. The network node may instruct a UE regarding which sidelink resources to use for sidelink communications. In a second mode, UEs may determine which sidelink resources to use for sidelink communications. In the second mode, in order to determine which sidelink resources are available for a Tx UE (e.g., a sidelink Tx UE) to use for transmitting sidelink data to an Rx UE (e.g., a sidelink Rx UE), the Tx UE may sense a channel for sidelink resource use by other nearby Tx UEs. Tx UEs may use sidelink control information (SCI) to reserve upcoming sidelink resources that are intended to be used for sidelink communications. By sensing the channel (e.g., receiving SCIs from the other nearby Tx UEs), the Tx UE may determine which upcoming sidelink resources are available for the Tx UE to use for the sidelink communications (e.g., sidelink resources that are not reserved by the other Tx UEs). Inter-UE coordination (IUC), or mode 2 resource selection, may be applicable for a sub-6 GHz frequency range (e.g., for sidelink without beamforming), but may be extended to sidelink with beamforming.

IUC may be associated with two different schemes. In a first scheme, Tx UEs may be enabled to (re)-select sidelink resources with assistance from nearby UEs. The nearby UEs may indicate which sidelink resources are preferred or not preferred, from a perspective of the nearby UEs, for the Tx UEs to use for sidelink communications. In the first scheme, assistance information (e.g., IUC information) may be transmitted by a UE triggered by a request from a Tx UE, or the assistance information (e.g., IUC information) may be transmitted by some condition being satisfied at the UE. The first scheme may be based at least in part on request-triggered assistance information or condition-triggered assistance information. In a second scheme, after the Tx UE has selected sidelink resources and transmits a resource reservation, a nearby UE may indicate to the Tx UE that the UE has a conflict with one of the sidelink resources selected by the Tx UE.

In the first scheme, a second UE (e.g., a Tx UE or UE-B) may have data to transmit, and the second UE may determine which sidelink resources are available to transmit the data. The second UE may transmit, to a first UE (e.g., a nearby UE or UE-A), an IUC request to provide assistance information (e.g., IUC information) regarding which sidelink resources the first UE prefers or not prefers the second UE to use to transmit the data. The assistance information may indicate a set of resources that the first UE wants the second UE to use to transmit the data (e.g., preferred resources), or a set of resources that the first UE does not want the second UE to use to transmit the data (e.g., non-preferred resources). The IUC request from the second UE may indicate which type of assistance information (e.g., preferred resources versus non-preferred resources) the second UE is requesting from the first UE. In some cases, the first UE may be an intended Rx UE of the second UE's sidelink transmission. When the second UE receives an indication of preferred resources from the first UE, the second UE may attempt to use the preferred resources to transmit the data (e.g., as much as possible). When the second UE receives an indication of non-preferred resources from the first UE, the second UE may not use the non-preferred resources to transmit the data.

The first UE may prefer or not prefer certain sidelink resources, and the second UE may be informed as to which sidelink resources are preferred by the first UE and which sidelink resources are non-preferred by the first UE. For the first UE to determine whether a sidelink resource is preferred or not preferred, the first UE may need to know if other nearby Tx UEs (e.g., other second UEs) are reserving the resource, which may be determined by the first UE sensing a channel for reservation SCIs from any other nearby Tx UEs.

Figure 4:
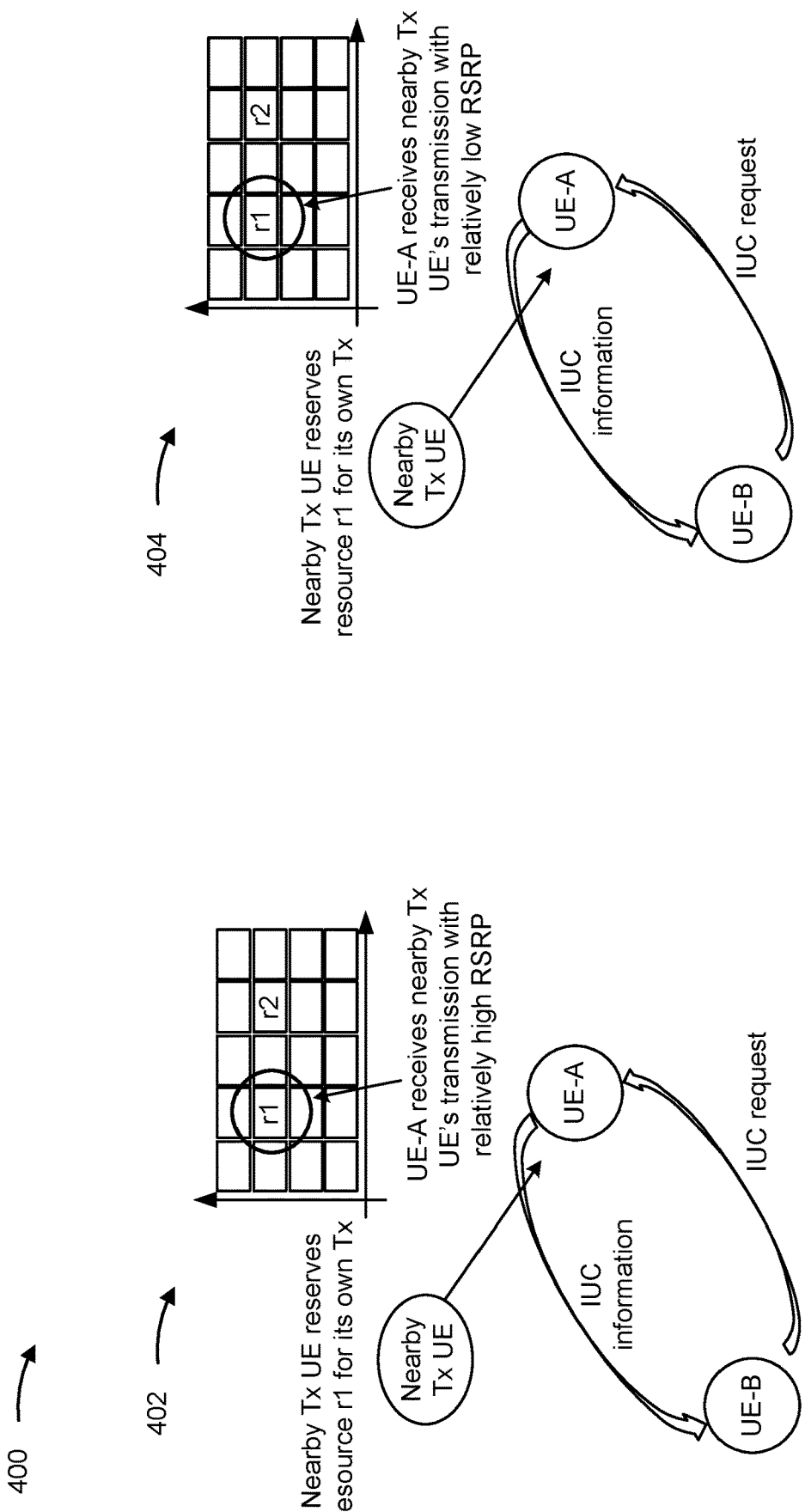
FIG. 4 is a diagram illustrating an example of preferred resources versus non-preferred resources, in accordance with the present disclosure.

FIG. 4 is a diagram illustrating an example 400 of preferred resources versus non-preferred resources, in accordance with the present disclosure.

As shown by reference number 402, a second UE (e.g., UE-B) may transmit an IUC request to a first UE (e.g., UE-A). A nearby Tx UE may reserve a first resource for its own transmission. The first UE may receive the nearby Tx UE's transmission with a relatively high RSRP. When the first UE is an intended Rx UE of the second UE, then the first UE may prefer that the second UE use a second resource to transmit, so that the first UE does not receive the second UE's signal and the nearby Tx UE's interfering signal in the same resource. The first UE may transmit, to the second UE, IUC information that indicates that the second resource is a preferred resource.

As shown by reference number 404, a second UE may transmit an IUC request to a first UE. A nearby Tx UE may reserve a first resource for its own transmission. The first UE may receive the nearby Tx UE's transmission with a relatively low RSRP. When the first UE is an intended Rx UE of the nearby Tx UE, then the first UE may not prefer the second UE to use the first resource. When the second UE transmits using the first resource, the second UE's signal may interfere with the first UE's desired signal from the nearby Tx UE.

As indicated above, FIG. 4 is provided as an example. Other examples may differ from what is described with regard to FIG. 4.

Figure 5:
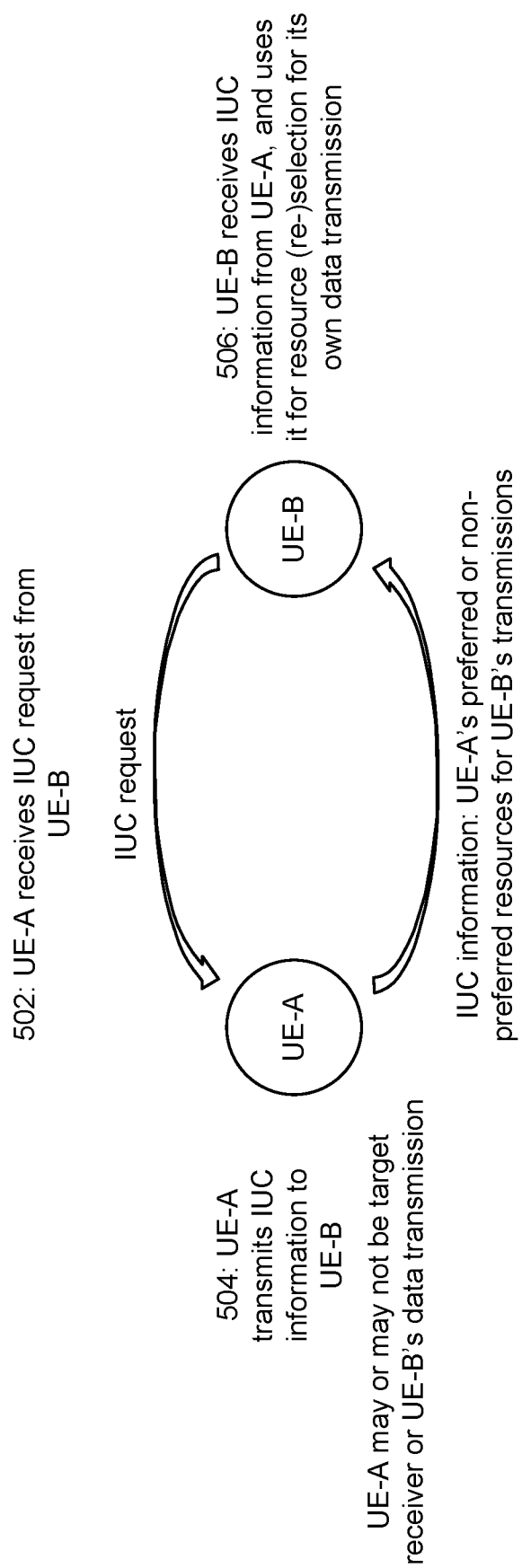
FIG. 5 is a diagram illustrating an example of an inter-UE coordination (IUC) information transmission, in accordance with the present disclosure.

FIG. 5 is a diagram illustrating an example 500 of an IUC information transmission, in accordance with the present disclosure.

As shown by reference number 502, in a first scheme associated with IUC, a first UE (e.g., UE-A) may receive an IUC request from a second UE (e.g., a Tx UE or UE-B). As shown by reference number 504, the first UE may transmit IUC information to the second UE. The first UE may or may not be a target receiver of the second UE's data transmission. The IUC information may indicate the first UE's preferred or non-preferred resources for the second UE's transmissions. As shown by reference number 506, the second UE may receive the IUC information from the first UE, and the second UE may use the IUC information to perform a resource selection (or reselection) for its own data transmission. An IUC information transmission in accordance with the first scheme may be triggered by a request, which may be enabled or disabled based at least in part on a configuration.

As indicated above, FIG. 5 is provided as an example. Other examples may differ from what is described with regard to FIG. 5.

An IUC information transmission may be triggered based at least in part on an IUC request. A resource pool level configuration may enable different alternatives. With respect to a trigger configuration, a second UE's implementation may determine whether or not to trigger a request generation, where the request generation may be triggered only when the second UE has data to be transmitted to a first UE. With respect to an IUC information type (e.g., preferred resources or non-preferred resources), the resource pool level configuration may enable different alternatives. For example, a resource set type to be provided in IUC information may be determined by a first UE's implementation and indicated in the IUC information, or the second UE's request may indicate a resource set type to be provided in the IUC information. With respect to a resource pool in which preferred resources or non-preferred resources are determined, the resource pool level configuration may configure a Tx resource pool in which the second UE transmits the IUC request, and the first UE may use the same Tx resource pool to transmit the IUC information.

An IUC information transmission may be triggered based at least in part on an IUC request. With respect to a first UE's channel sensing parameters, when a second UE requests preferred resources from the first UE, the second UE's IUC request may indicate a $prio_{TX}$ of the second UE's intended transmission, an $L_{subCH}$ of the second UE's intended transmission, a $P_{rsvp\_Tx}$ of the second UE's intended transmission, and start/end times of a resource selection window (e.g., packet delay budget (PDB) of the second UE's transmission), where start/end times of the resource selection window may be a combination of a direct frame number (DFN) index and a slot index. The second UE's $prio_{TX}$ may be used to determine an RSRP threshold, which may be used to determine a resource availability (e.g., when an RSRP associated with a resource satisfies a threshold, the resource may not be available). The second UE's $L_{subCH}$ may indicate a quantity of subchannels that the second UE will use for transmissions. The second UE's $P_{rsvp\_Tx}$ may indicate a time interval between the second UE's periodic transmissions. The first UE may perform a PHY layer channel sensing based at least in part on $prio_{TX}$, $L_{subCH}$, $P_{rsvp\_Tx}$, and the start/end times of the resource selection window, and the first UE may determine which sidelink resources are available for the second UE to use for transmitting (e.g., to the first UE).

An IUC information transmission may be triggered based at least in part on an IUC request. With respect to a priority of IUC information, when configured, the priority of the IUC information may be a configured value. Otherwise, the priority of the IUC information may be the same as indicated by a second UE's IUC request. When the IUC information is transmitted together with other data, a priority value of a multiplexed sidelink transmission may be a smallest priority value (e.g., highest priority) between the IUC information and the other data. Whether or not to transmit the IUC information based at least in part on the IUC request may be determined by a first UE's implementation, which may be subject to an uplink/sidelink prioritization, an LIE sidelink and NR sidelink prioritization, and congestion control. With respect to a priority of the IUC request, when configured, the priority of the IUC request may be a configured value. Otherwise, the priority of the IUC request may be the same as a priority of a transport block to be transmitted by the second UE. When the IUC request is transmitted together with other data, a priority value of a multiplexed sidelink transmission may be determined by a smallest priority value (e.g., highest priority) between the IUC request and the other data. With respect to a cast type, unicast may be supported for an explicit IUC request transmission for IUC information, and unicast may be used for the IUC information transmission triggered by an explicit IUC request.

An SCI format 2-C or medium access control control element (MAC-CE) may be used to carry an IUC request. The SCI format 2-C or the MAC-CE for the IUC request may indicate a providing/requesting indicator, a priority, a quantity of subchannels, a resource reservation period, a resource selection window location, and/or a resource set type. The priority, the quantity of subchannels, the resource reservation period, and the resource selection window location may correspond to a second UE's intended Tx parameters, which may be needed by a first UE to determine preferred resources. The resource selection window location may be associated with slots n+$_{r1}$ and n+$_{r2}$. The resource set type may correspond to a preferred resource set or a non-preferred resource set.

An SCI format 2-C may indicate all fields present in an SCI format 2-A except for a cast type indicator. A resource pool level (pre-)configuration may enable different alternatives. In a first example, a MAC CE and a second stage SCI may be used as a container of an explicit request transmission from the second UE to the first UE. When both SCI format 2-C and a MAC CE are used as a container of an explicit request for IUC information, the same bit field size for the request in the SCI format 2-C may be applied to the MAC CE. SCI 2-C may be UE RX optional. A UE implementation may determine whether to additionally use the second stage SCI for the second UE. In a second example, a MAC CE may be used as a container of an explicit request transmission from the second UE to the first UE. When the MAC CE is only used as the container of an explicit request for IUC information, the same bit field size for the request in the SCI format 2-C may be applied to the MAC CE A first UE may determine a third UE's reserved resources based at least in part on a channel sensing. The first UE may be sensing (or receiving) for SCIs from nearby Tx UEs, which may include the third UE. The SCIs may indicate upcoming resource reservations, and based at least in part on the reservations, the first UE may determine which resources are available. The SCIs may include time resource assignments (TRAs), frequency resource assignments (FRAs), and resource reservation interval (RRI) fields, which may be used to indicate the upcoming resource reservations. The third UE's SCI may be directed to an intended Rx UE, and the first UE may happen to receive the second UE's SCI in this scenario. An available resource determination may be based at least in part on RSRPs of received SCIs, a priority of the first UE's transmission (e.g., when the first UE determines available resources for its own transmission), and/or priorities in the received SCIs.

Figure 6:
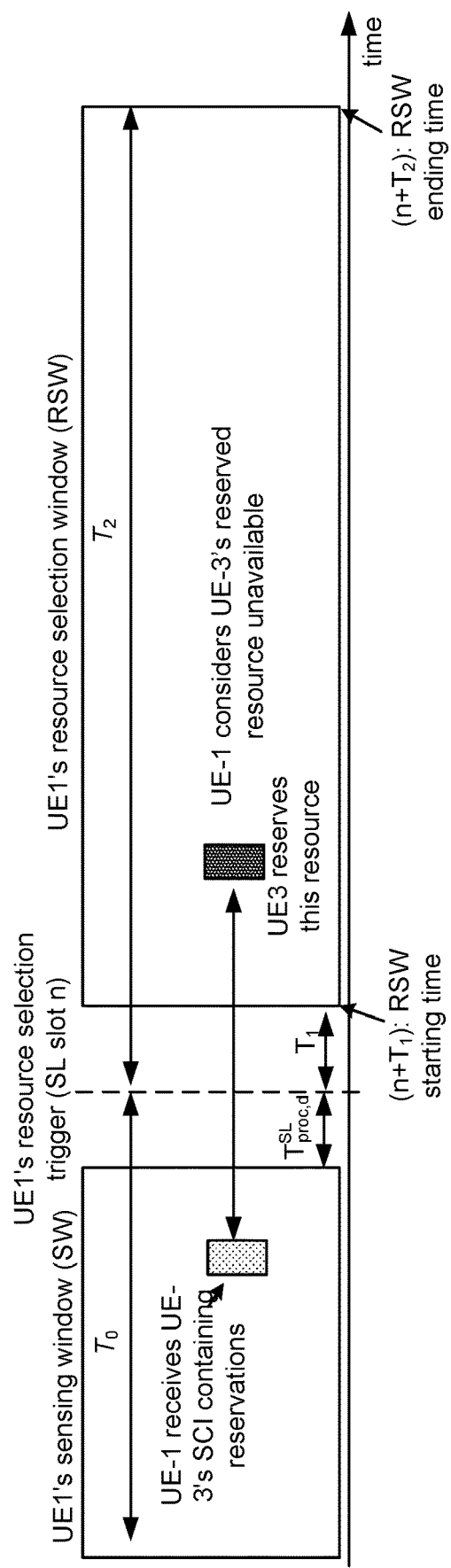
FIG. 6 is a diagram illustrating an example of channel sensing, in accordance with the present disclosure.

FIG. 6 is a diagram illustrating an example 600 of channel sensing, in accordance with the present disclosure.

As shown in FIG. 6, in channel sensing that is independent of IUC, a first UE (e.g., UE-1) may receive a third UE's (e.g., UE-3) SCI which indicates a resource reservation. The first UE may receive the third UE's SCI during the first UE's sensing window. The first UE's resource selection trigger may occur at a sidelink slot n. The SCI that indicates the third UE's resource reservation may reserve a resource in the first UE's resource selection window, which may be associated with a start time (e.g., n+T$_1$) and an end time (e.g., n+T$_2$). The first UE may determine which resources are reserved and which resources are available during the first UE's resource selection window. When the first UE receives the third UE's SCI with an RSRP that satisfies a threshold (e.g., the RSRP is greater than the threshold), which may depend on a priority indicated in the SCI or the first UE's Tx priority, then the first UE may consider the third UE's reserved resource as unavailable.

As indicated above, FIG. 6 is provided as an example. Other examples may differ from what is described with regard to FIG. 6.

When determining preferred resources, a first UE may determine (or assume) properties of a second UE's intended transmission, so that the first UE may perform a PHY layer channel sensing. The PHY layer channel sensing may be for determining available resources for the second UE's transmission. The first UE may determine the properties of the second UE's intended transmission because whether a resource is available or not available for a transmission may depend on properties of the transmission (e.g., an RSRP threshold may depend on a priority of the second UE's transmission). A Tx resource selection may be enabled based at least in part on an Rx UE channel sensing. An IUC request may not have a field for indicating whether or not the first UE is the intended Rx UE, but when the IUC request indicates the preferred resource, then the first UE is likely the intended Rx UE. When determining non-preferred resources, the first UE may not determine properties of the second UE's intended transmission. The first UE may measure RSRPs of nearby Tx UEs' transmissions and compute corresponding priorities and resource reservations. An Rx UE assisted Tx resource selection may be enabled. The first UE may still be the second UE's intended Rx UE, even when the IUC request from the second UE indicates the non-preferred resource.

With respect to a first condition for preferred resources, the preferred resources may be resource(s) excluding those overlapping with reserved resource(s) of other UEs identified by a first UE whose RSRP measurements satisfy an RSRP threshold (e.g., are larger than the RSRP threshold). A set of resources preferred for a second UE's transmission may be a form of candidate single-slot resources. When an IUC information transmission is triggered by the second UE's request, the second UE may signal at least the various parameters to the first UE, which may include a priority value of a PSCCH/PSSCH, a quantity of subchannels of the PSCCH/PSSCH, a resource reservation interval, and/or start/end times of a resource selection window. An RSRP threshold increase may be applied, and a maximum limit of RSRP threshold increase may be defined. When the IUC information transmission is triggered by a condition, parameter values may be (pre)-configured for a resource pool for determining the preferred resource. When no (pre)-configuration is available, the first UE may determine by its implementation the parameter values, which may include parameter values for prio$_{TX}$, L$_{subCH}$, P$_{rsvp\_Tx}$. The first UE may determine by its implementation values of n+T1 and n+T$_2$, which may define the resource selection window. With respect to a second condition for preferred resources, the first UE may be the second UE's intended receiver. The set of resources preferred for the second UE's transmission may be a form of candidate single-slot resources. The first UE may exclude candidate single-slot resource(s) belonging to slot(s) where the first UE, which is the intended receiver of the second UE, does not expect to perform a sidelink reception from the second UE due to a half-duplex operation.

A first UE may be a sensing UE, and a third UE may be a nearby Tx UE, which may transmit SCI indicating resource reservations. The first UE may determine which resources are preferred for a second UE's transmission within the first UE's resource selection window, which may be based at least in part on the SCI indicating the resource reservations. The first UE may be sensing (or receiving) for SCIs from nearby Tx UEs. The first UE's channel sensing for SCIs from the nearby Tx UEs may be triggered by the second UE's IUC request to the first UE. The IUC request from the second UE may indicate sensing parameters for the first UE to use when determining preferred resources. The nearby UE's SCI may be directed to an intended Rx UE, and the first UE may happen to receive the nearby UE's SCI in this scenario. An available resource determination may be based at least in part on RSRPs of received SCIs, a priority of the second UE's IUC request, and/or priorities in the received SCIs.

Figure 7:
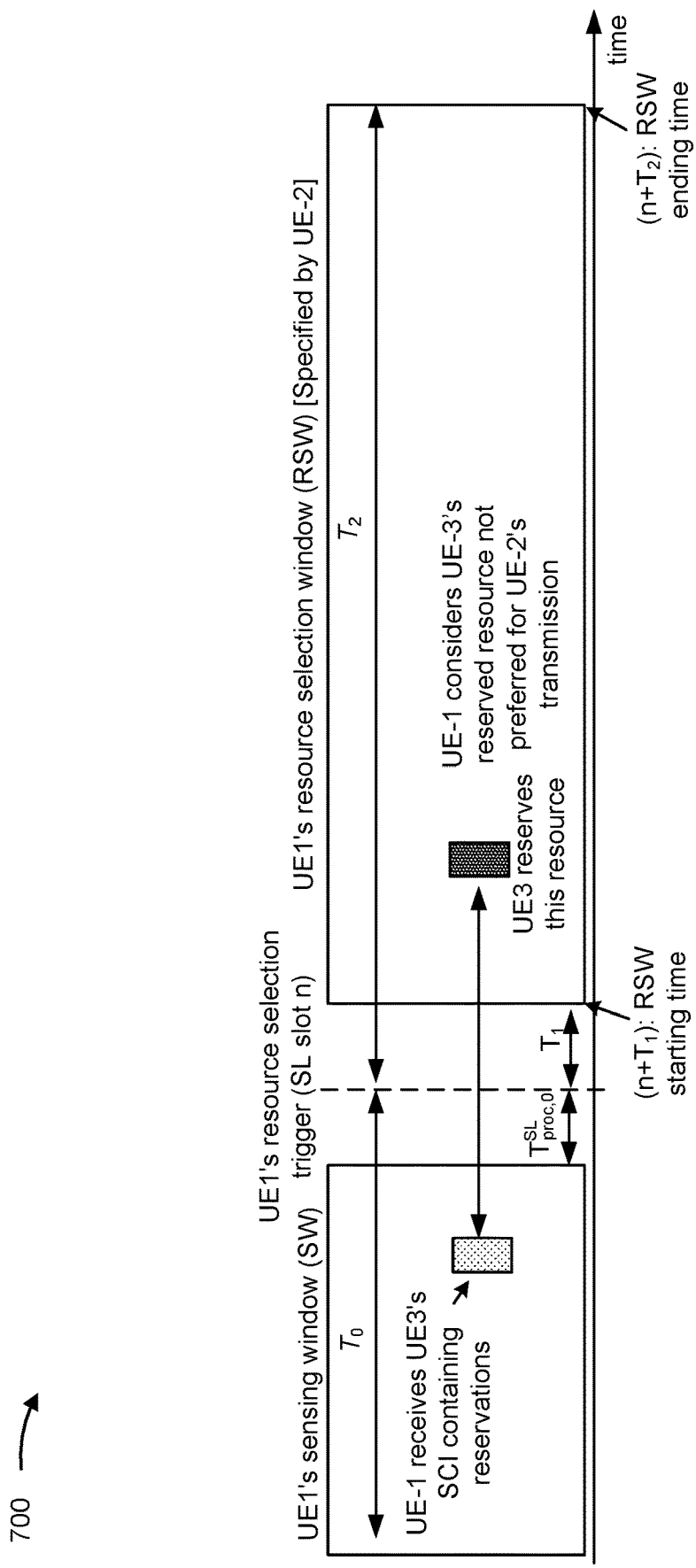
FIG. 7 is a diagram illustrating an example of determining preferred resources, in accordance with the present disclosure.

FIG. 7 is a diagram illustrating an example 700 of determining preferred resources, in accordance with the present disclosure.

As shown in FIG. 7, a first UE (e.g., UE-1) may receive a third UE's (e.g., UE-3) SCI which indicates a resource reservation. The first UE may receive the third UE's SCI during the first UE's sensing window. The first UE's resource selection trigger may occur at a sidelink slot n. The SCI that indicates the third UE's resource reservation may reserve a resource in the first UE's resource selection window, which may be specified by a second UE (e.g., UE-2), and which may be associated with a start time (e.g., n+T$_1$) and an end time (e.g., n+T$_2$). The first UE may determine which resources are preferable for the second UE's transmission during the first UE's resource selection window. When the first UE receives the third UE's SCI with an RSRP that satisfies a threshold (e.g., the RSRP is greater than the threshold), which may depend on a priority indicated in the SCI and a priority indicated in the second UE's IUC request, then the first UE may consider the third UE's reserved resource as not preferable for the second UE's transmission. In other words, the first UE may not prefer the second UE to use the third UE's reserved resource for the second UE's transmission, and other resources in the first UE's resource selection window may be preferred.

As indicated above, FIG. 7 is provided as an example. Other examples may differ from what is described with regard to FIG. 7.

With respect to a first condition for non-preferred resources, in a first option, reserved resource(s) of other UE(s) may be identified by a first UE whose RSRP measurement is larger than a (pre)configured RSRP threshold, which may be determined by at least a priority value indicated by SCI of the UE(s). In the first option, the first UE may be a second UE's intended Rx UE. The first UE may not want the second UE to transmit in resources in which the first UE can receive other UE's transmission with RSRP larger than the (pre)configured RSRP threshold because, if the second UE does transmit in those non-preferred resources, the second UE's transmission may be interfered with by other UEs' transmissions. The first UE may be less likely to receive the second UE's transmission due to interference from the other UEs if the RSRP of the other UEs' transmissions may be relatively high. Thus, the first UE may not want the second UE to transmit in the same resource as the other UE in which the RSRP of the other UE's transmission is larger than the RSRP threshold. In a second option, the reserved resource(s) of the other UE(s) may be identified by the first UE whose RSRP measurement is smaller than the (pre)configured RSRP threshold, which may be determined by at least the priority value indicated by the SCI of the UE(s) when the first UE is a destination of a transport block transmitted by the UE(s). In the second option, the first UE may be the other UEs' intended Rx UE. The first UE may not want the second UE to transmit in the reserved resources of the other UEs because, in these resources, the first UE may be receiving transmissions from the other UEs. If the RSRP of the other UEs' transmissions is lower than the (pre)configured RSRP threshold, the first UE may not want the second UE to transmit in the same resource. Otherwise, the second UE may cause interference with the first UE's reception. With respect to a second condition for non-preferred resources, the first UE may be the second UE's intended receiver. In some resource(s) (e.g., slot(s)), the first UE, when it is the intended receiver of the second UE, may not expect to perform a sidelink reception from the second UE due to a half-duplex operation. Under the second condition, those resources in which the first UE does not expect to receive from the second UE may be the first UE's non-preferred resources.

Figure 8:
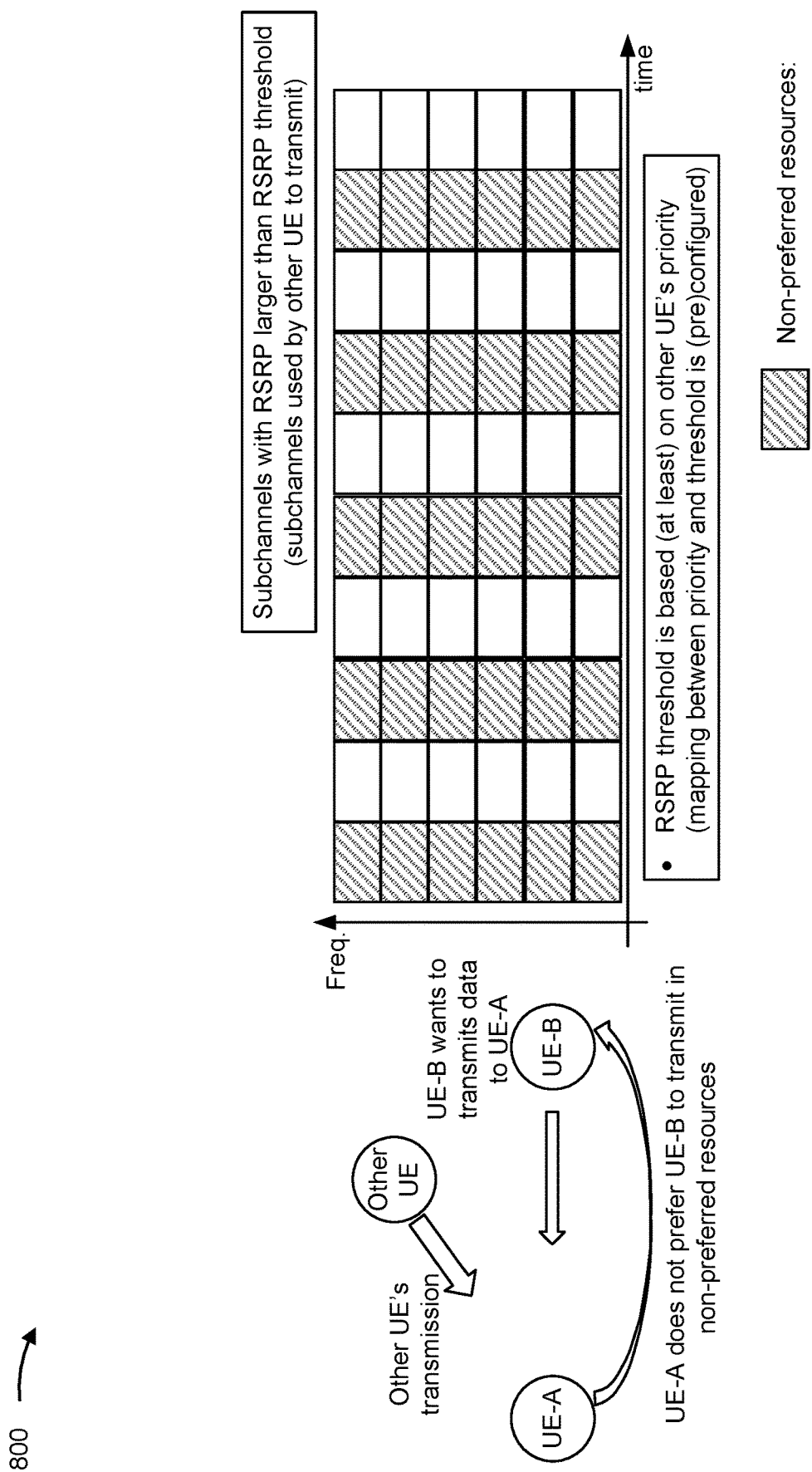
FIG. 8 is a diagram illustrating an example of non-preferred resources, in accordance with the present disclosure.

FIG. 8 is a diagram illustrating an example 800 of non-preferred resources, in accordance with the present disclosure.

As shown in FIG. 8, in a first option, a first UE (e.g., UE-A) may be a second UE's (e.g., UE-B's) intended Rx UE. The second UE may have data to transmit to the first UE. One other UE may perform a transmission on certain resources, (shaded resources in FIG. 8) which may correspond to subchannels with RSRP measurements larger than an RSRP threshold (e.g., subchannels used by the other UE to transmit). The RSRP threshold may be based at least in part on the other UE's priority (e.g., a mapping between priority and the RSRP threshold may be (pre)-configured). The first UE may prefer that the second UE does not transmit using these resources (shaded resources in FIG. 8), since such resources may be considered to be non-preferred resources due to the RSRP measurements being larger than the RSRP threshold.

As indicated above, FIG. 8 is provided as an example. Other examples may differ from what is described with regard to FIG. 8.

Figure 9:
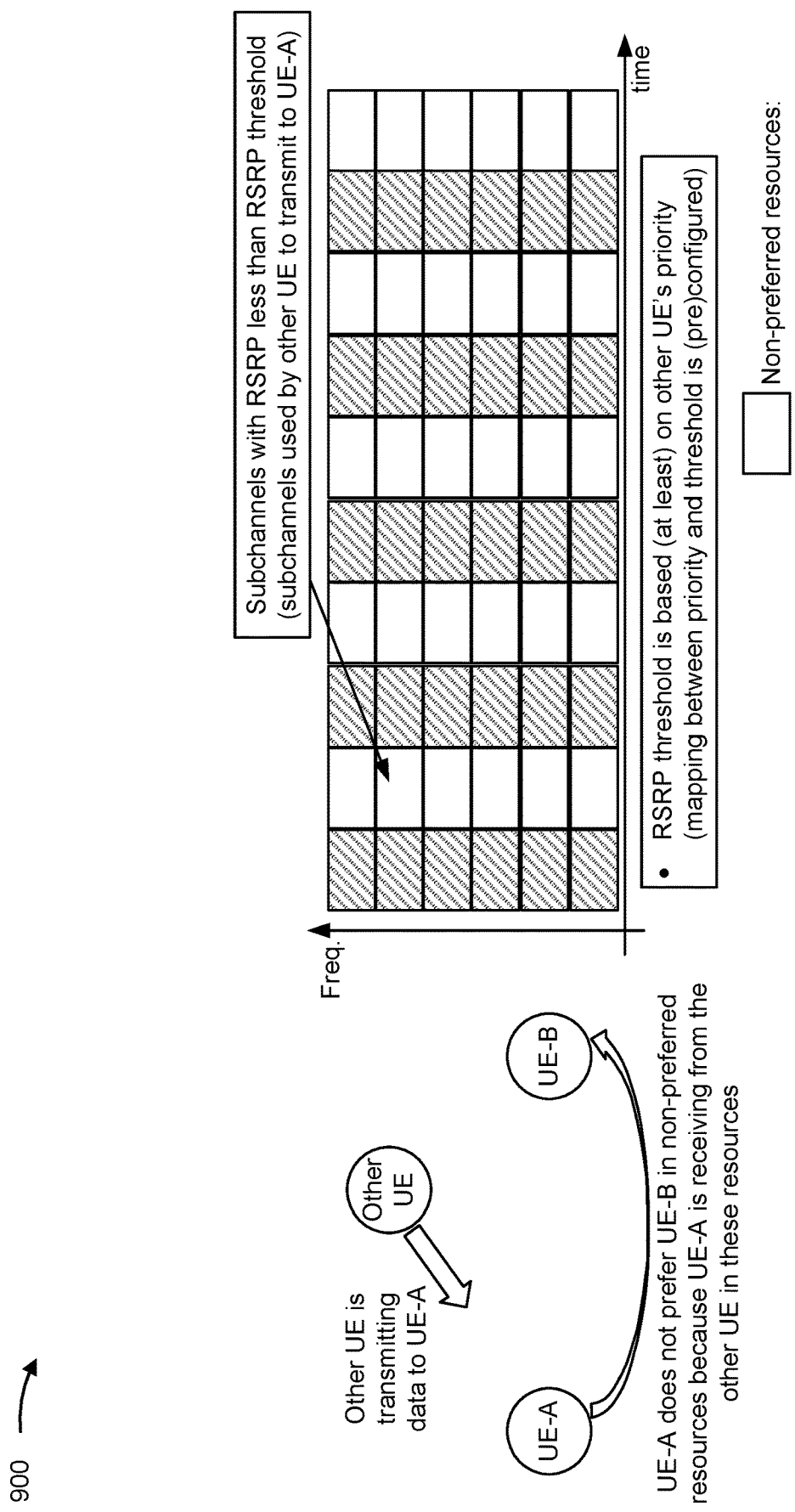
FIG. 9 is a diagram illustrating an example of non-preferred resources, in accordance with the present disclosure.

FIG. 9 is a diagram illustrating an example 900 of non-preferred resources, in accordance with the present disclosure.

As shown in FIG. 9, in a second option, a first UE (e.g., UE-A) may not be a second UE's (e.g., UE-B's) intended Rx UE. One other UE may have data to transmit to the first UE. The other UE may perform a transmission on certain resources (non-shaded resources in FIG. 9), which may correspond to subchannels with RSRP measurements less than an RSRP threshold (e.g., subchannels used by the other UE to transmit to the first UE). The RSRP threshold may be based at least in part on the other UE's priority (e.g., a mapping between priority and the RSRP threshold may be (pre)-configured). The first UE may not prefer the second UE to transmit using these resources because the first UE may be receiving from the other UE in these resources. The first UE may not want the second UE to transmit in these resources, which may not exceed the RSRP threshold.

As indicated above, FIG. 9 is provided as an example. Other examples may differ from what is described with regard to FIG. 9.

A first UE may be a sensing UE, and a third UE may be a nearby Tx UE, which may transmit SCI indicating resource reservations. The first UE may determine which resources are not preferred within the first UE's resource selection window, which may be based at least in part on the SCI indicating the resource reservations. The first UE may be sensing (or receiving) for SCIs from nearby Tx UEs, which may include the third UE. The first UE's channel sensing for the SCIs from the nearby Tx UEs may be triggered by a second UE's IUC request to the first UE. The third UE's SCI may be directed to an intended Rx UE, and the first UE may happen to receive the third UE's SCI in this scenario. A non-preferred resource determination may be based at least in part on RSRPs of received SCIs and priorities in the received SCIs.

Figure 10:
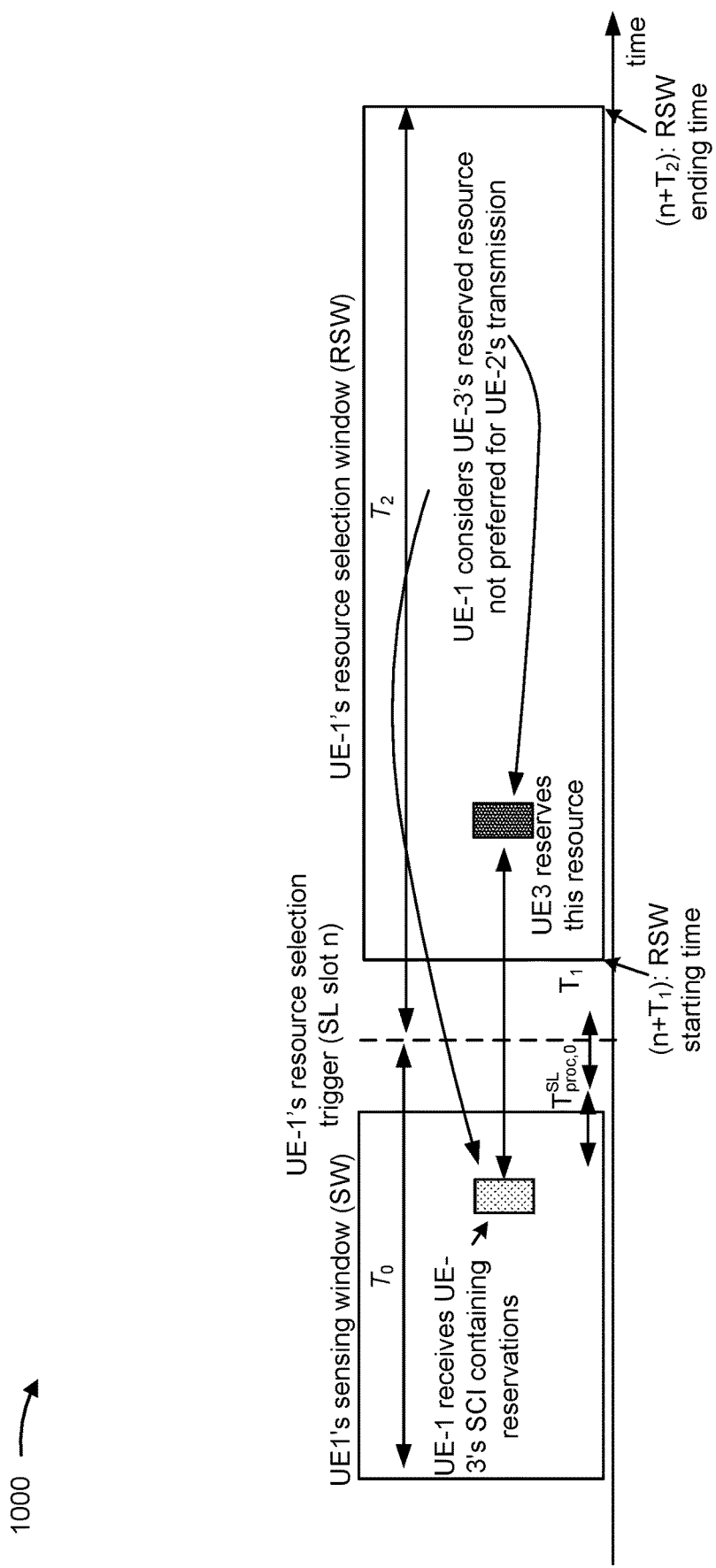
FIG. 10 is a diagram illustrating an example of determining non-preferred resources, in accordance with the present disclosure.

FIG. 10 is a diagram illustrating an example 1000 of determining non-preferred resources (the first option), in accordance with the present disclosure.

As shown in FIG. 10, a first UE (e.g., UE-1) may receive a third UE's (e.g., UE-3) SCI which indicates a resource reservation. The first UE may receive the third UE's SCI during the first UE's sensing window. The first UE's resource selection trigger may occur at a sidelink slot n. The SCI that indicates the third UE's resource reservation may reserve a resource in the first UE's resource selection window, which may be specified by a second UE (UE-2), and which may be associated with a start time (e.g., $n+T_1$) and an end time (e.g., $n+T_2$). The first UE may determine which resources are not preferable during the first UE's resource selection window. When the first UE receives the third UE's SCI with an RSRP that satisfies a threshold (e.g., the RSRP is greater than the threshold), which may depend on a priority indicated in the SCI, then the first UE may consider the third UE's reserved resource as not preferable. In other words, the first UE may not prefer the second UE to transmit in the third UE's reserved resource.

As indicated above, FIG. 10 is provided as an example. Other examples may differ from what is described with regard to FIG. 10.

A second UE, after receiving IUC information, may perform a Tx resource selection based at least in part on a sensing result and the IUC information, or only on the IUC information (e.g., preferred resources). The second UE may receive an indication of preferred resources in the IUC information. The second UE may perform a selection based only on the IUC information, which may correspond to an Rx UE sensing-based Tx resource selection. The second UE may perform a selection based at least in part on the second UE's sensing and the IUC information, which may correspond to an Rx UE assisted Tx resource selection. The second UE's MAC entity may select Tx resources based at least in part on the sensing result and the IUC information, where the IUC information may be directed to the second UE's MAC entity. The second UE may receive an indication of non-preferred resources in the IUC information, which may correspond to a selection based at least in part on the second UE's sensing and the IUC information. The selection may be an Rx UE assisted Tx resource selection. The second UE's PHY layer may eliminate non-preferred resources from the sensing result before reporting to the MAC entity, where the IUC information may be directed to the second UE's PHY layer.

The second UE may perform various behaviors based at least in part on a reception of IUC information, with regard to a preferred resource set. In a first option, the second UE's resource(s) to be used for its transmission resource (re-)selection may be based at least in part on both the second UE's sensing result (if available) and received IUC information. The second UE may use, in a resource (re-)selection, resource(s) belonging to the preferred resource set in combination with its own sensing result. The second UE may use, in the resource (re-)selection, resource(s) not belonging to the preferred resource set when certain condition(s) are satisfied. The first option may be supported when the second UE performs a sensing/resource exclusion. A MAC layer of the second UE may select resources using S_A (sensing result) and the received preferred resource set. The MAC layer may select resources for transmissions within an intersection of S_A and the preferred resource set until selecting a resource within the intersection becomes not possible. When a quantity of selected resources is smaller than a required quantity of transmissions for a transport block, the MAC layer may select resources for remaining transmissions outside the intersection but inside $S_A$. In a second option, the second UE's resource(s) to be used for a transmission resource (re-)selection may be based only on received IUC information. The second UE may use, in a resource (re-)selection, resource(s) belonging to the preferred resource set. The second option may be supported at least when the second UE does not support a sensing/resource exclusion.

For the second UE's behavior when the second UE receives multiple preferred resource sets from different first UEs, the second UE may use each received preferred resource set for its resource selection for each transport block to be transmitted to each first UE providing the preferred resource set. For the second UE's behavior when the second UE receives multiple preferred resource sets from the same first UE, the second UE may use one or multiple preferred resource sets in a resource (re-)selection based at least in part on an implementation.

The second UE may perform various behaviors based at least in part on a reception of IUC information, with regard to a non-preferred resource set. The second UE's resource(s) to be used for a transmission resource (re-)selection may be based at least in part on both the second UE's sensing result (if available) and received IUC information. A PHY layer at the second UE may exclude, in its resource (re-)selection, candidate single-slot resource(s) overlapping with the non-preferred resource set. When a quantity of candidate single-slot resources after applying the received non-preferred resource set cannot meet a certain requirement, a second UE's implementation may define whether to take the received non-preferred resource set in a resource selection to meet this requirement.

For the second UE's behavior when the second UE receives both a single preferred resource set and a single non-preferred resource set from different first UEs, a second UE's implementation may define whether to use one or multiple resource sets in a resource (re-) selection. For the second UE's behavior when the second UE receives both a single preferred resource set and a single non-preferred resource set from the same first UE, a second UE's implementation may define whether to use one or multiple resource sets in a resource (re-) selection. The second UE's behavior may be defined when the second UE receives multiple non-preferred resource sets from different first UEs. The second UE's behavior may be defined when the second UE receives multiple non-preferred resource sets from the same first UE.

When using a mmWave channel (e.g., FR2, which may correspond to 28 GHz) for sidelink communications, UEs may use beamforming. Otherwise, a signal attenuation may be too large and may result in a low signal-to-noise-ratio (SNR) at an Rx UE. Beamforming may involve directing a signal to propagate in a desired direction, where the desired direction may be a propagation path from a Tx UE to an Rx UE that results in a best SNR at the Rx UE (e.g., when interference is not an issue). A pair of the Tx UE and the Rx UE may have multiple signal propagation paths, and the pair may use only one signal propagation path with beamforming (e.g., depending on a UE beamforming capability).

Figure 11:
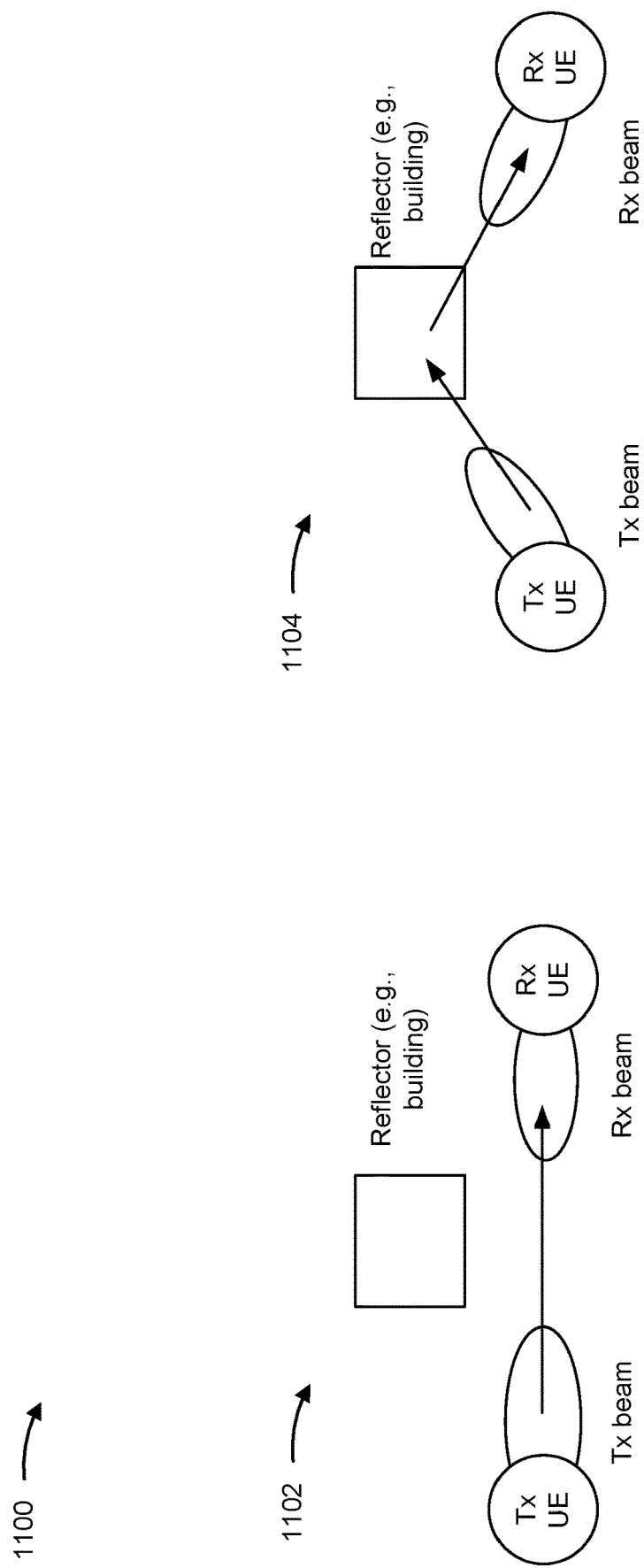
FIG. 11 is a diagram illustrating an example of beamforming, in accordance with the present disclosure.

FIG. 11 is a diagram illustrating an example 1100 of beamforming, in accordance with the present disclosure.

As shown by reference number 1102, a Tx UE may transmit using a Tx beam, and an Rx UE may receive using an Rx beam. The Tx beam and the Rx beam may avoid a reflector (e.g., a building)

As shown by reference number 1104, a Tx UE may transmit using a Tx beam, and an Rx UE may receive using an Rx beam. A reflector (e.g., a building) may be in a path associated with the Tx beam and the Rx beam. For example, the Tx UE may transmit a signal using the Tx beam, the signal may be reflected off of the reflector, and the signal may be received by the Rx UE using the Rx beam.

As indicated above, FIG. 11 is provided as an example. Other examples may differ from what is described with regard to FIG. 11.

Before a useful communication may occur between two UEs (e.g., two sidelink UEs), the UEs may need to discover each other and establish at least one pair of beams (e.g., one beam for each UE). When IUC information is triggered by a request and is based at least in part on an mmWave frequency, a first UE and a second UE may determine an identity of each other and may establish at least one pair of beams for communicating between the first UE and the second UE. Unicast may be supported for transmitting an explicit IUC request for IUC information. Unicast may be used for transmitting the IUC information triggered by the explicit IUC request. Unlike for IUC information triggered by a condition, a broadcast or groupcast of IUC information triggered by an IUC request may not be supported. Thus, when IUC information is extended to mmWave sidelink, only unicast may be supported for IUC information triggered by request. Unicast may involve a communication from one UE directly to another UE, and may require that both UEs have information on each other and have established a beamformed link between each other. The first UE and the second UE may store information regarding which resources (e.g., time, frequency, and beam) to use when communicating with each other (e.g., for at least control information).

When determining preferred resources or non-preferred resources for a second UE's transmission, a first UE may need to determine which Tx beam the second UE will use to perform the transmission, as well as which Rx beam the first UE should use to perform a channel sensing. Signal propagation paths corresponding to different Tx beams of the second UE may have different amounts of interference, and thus may result in different sets of preferred/non-preferred resources for different Tx beams of the second UE.

Figure 12:
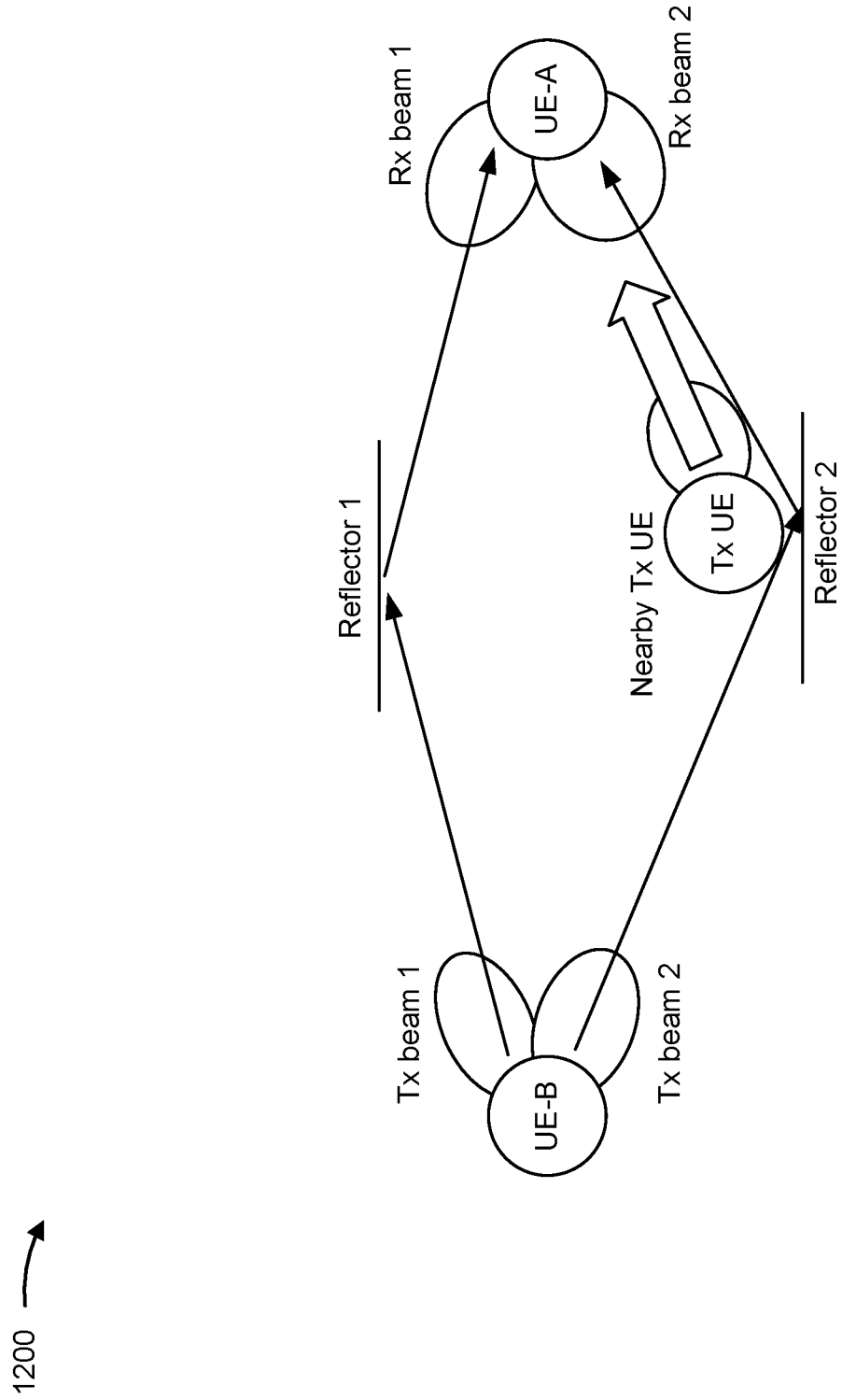
FIG. 12 is a diagram illustrating an example of different propagation paths for a UE, in accordance with the present disclosure.

FIG. 12 is a diagram illustrating an example 1200 of different propagation paths for a UE, in accordance with the present disclosure.

As shown in FIG. 12, a first UE (e.g., UE-A) may have a first Rx beam and a second Rx beam. A second UE (e.g., UE-B) may have a first Tx beam and a second Tx beam. The first Rx beam and the first Tx beam may form a first beam pair, and the second Rx beam and the second Tx beam may form a second beam pair. The second UE may have two propagation paths for the first Tx beam and the second Tx beam. A first propagation path may be associated with a first reflector. The second propagation path may be associated with a second reflector. The second propagation path may be associated with interference due to a nearby Tx UE transmitting toward the first UE. The first UE may not prefer the second UE to transmit in any resource on the second Tx beam due to the interference caused by the nearby Tx UE. However, the first UE may be unaware of which Tx beam the second UE will use to perform a transmission (e.g., the second UE may use the second Tx beam, which may not be preferred by the first UE). The first UE may not be configured to determine which Tx beam the second UE will use to perform the transmission. When the first UE is unable to determine which Tx beam the second UE will use for performing the transmission, the first UE may be unable to determine which Rx beam to use to perform a channel sensing for determining preferred/non-preferred resources.

As indicated above, FIG. 12 is provided as an example. Other examples may differ from what is described with regard to FIG. 12.

In various aspects of techniques and apparatuses described herein, a first UE (e.g., an Rx UE or UE-A) may receive, from a second UE (e.g., a Tx UE or UE-B) and via an Rx beam of the first UE, an IUC request. The IUC request may be a request for IUC information, such as information regarding an intended transmission of the second UE. The IUC information may include preferred resources or non-preferred resources for the intended transmission of the second UE, which may be from the perspective of the first UE (e.g., the UE that does not transmit the intended transmission). The first UE may indicate, via the IUC information, which resources are preferred or not preferred by the first UE for the intended transmission of the second UE. The second UE may transmit the IUC request based at least in part on a Tx beam of the second UE that is associated with the intended transmission of the second UE. The second UE may intend to transmit the intended transmission to a third UE (e.g., a second Rx UE) using the Tx beam of the second UE.

In some aspects, the first UE may transmit, to the second UE and in response to the IUC request, the IUC information, which may indicate the preferred resources or the non-preferred resources for the intended transmission of the second UE. The IUC information may be based at least in part on a channel sensing by the first UE using the Rx beam of the first UE. In other words, the first UE may perform the channel sensing using the Rx beam of the first UE, and based at least in part on the channel sensing, the first UE may determine the preferred resources or the non-preferred resources for the intended transmission of the second UE, which may be indicated in the IUC information. The first UE may be configured to perform the channel sensing using the Rx beam of the first UE that corresponds to the Tx beam of the second UE used to transmit the IUC request, and the first UE may not use any other Rx beams of the first UE to perform the channel sensing. The second UE may receive the IUC information from the first UE. The second UE may transmit, based at least in part on the IUC information, the intended transmission using the Tx beam of the second UE. The second UE may transmit the intended transmission in accordance with the preferred resources or the non-preferred resources.

In some aspects, the second UE may use an implicit signaling to indicate the Tx beam (e.g., an intended Tx beam) of the intended transmission, as the first UE may infer that the second UE will use the same Tx beam for transmitting the IUC request and for transmitting the intended transmission. The first UE may infer that the Tx beam associated with the IUC request is the same Tx beam that the second UE will use to transmit the intended transmission. Thus, the first UE may perform the channel sensing using the Rx beam of the first UE that is associated with the Tx beam of the second UE. As a result, the first UE may determine which Rx beam of the first UE to use for the channel sensing without a new field in the IUC request, which may reduce a quantity of bits associated with the IUC request.

Figure 13:
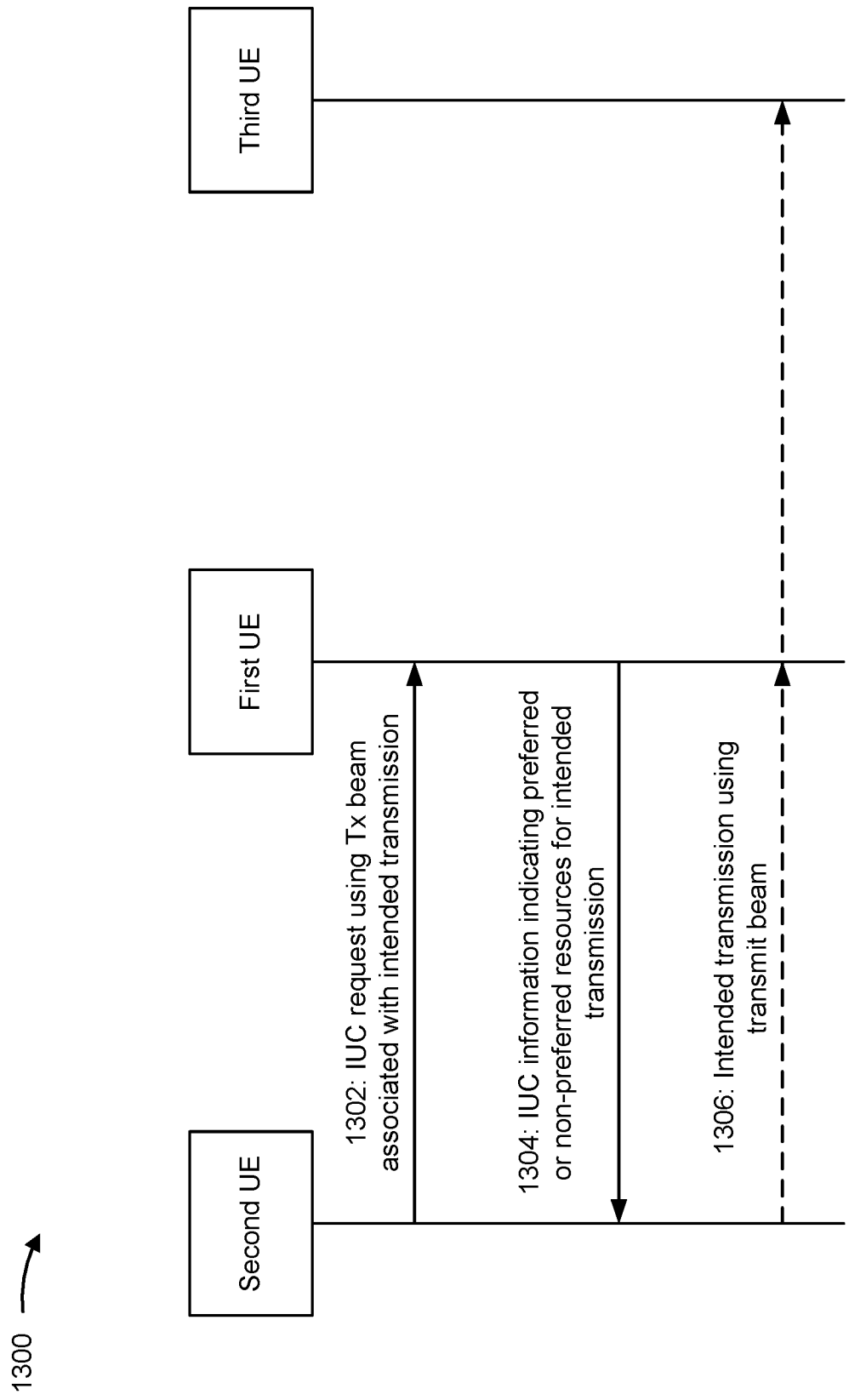
FIGS. 13-14 are diagrams illustrating examples associated with transmitting IUC information based at least in part on beamforming, in accordance with the present disclosure.

FIG. 13 is a diagram illustrating an example 1300 associated with transmitting IUC information based at least in part on beamforming, in accordance with the present disclosure. As shown in FIG. 13, communication may occur between a first UE (e.g., UE 120a) and a second UE (e.g., UE 120e). In some aspects, the first UE and the second UE may be included in a wireless network, such as wireless network 100.

As shown by reference number 1302, the first UE (e.g., an Rx UE or UE-A) may receive, from the second UE and via an Rx beam of the first UE, an IUC request. The IUC request may be a request for an indication of preferred resources or non-preferred resources, from the perspective of the first UE, for an intended transmission of the second UE. In other words, the first UE may prefer certain resources (e.g., preferred resources) to be used for the intended transmission of the second UE, and/or the first UE may not prefer certain resources (e.g., non-preferred resources) to be used for the intended transmission of the second UE. The Rx beam of the first UE may be associated with a spatial relation or a transmission configuration indication (TCI) state or spatial filter.

In some aspects, the IUC request may be based at least in part on a Tx beam of the second UE that is associated with the intended transmission of the second UE. In other words, the second UE may transmit the IUC request using the Tx beam which is the same Tx beam to be used by the second UE to transmit the intended transmission. The Tx beam of the second UE for transmitting the IUC request and the Tx beam of the second UE for transmitting the intended transmission may be quasi co-located Tx beams. Two beams may be quasi co-located if, for a given channel, a signal transmitted (or received) using one beam will have the same or similar signal propagation characteristics as when the same signal is transmitted (or received) using the other beam. The signal propagation characteristics may be a Doppler shift, a Doppler spread, an average delay, a delay spread, or a spatial receiver parameter. Quasi co-located beams may have their main lobes directed at the same or similar spatial angle, or their beam width may be the same or similar. Two beams (Tx and Tx, or Tx and Rx, or Rx and Rx) of a wireless device that are considered to be quasi co-located may be identical, e.g., two beams are the same. The first UE may determine that the Tx beam used by the second UE for transmitting the IUC request is the same Tx beam to be used by the second UE when transmitting the intended transmission. The Tx beam of the second UE for transmitting the IUC request and the Rx beam of the first UE to receive the IUC request may form a beam pair.

In some aspects, the first UE may perform a channel sensing using the Rx beam of the first UE used to receive the IUC request. The Rx beam of the first UE used for the channel sensing and the Rx beam used for receiving the IUC request may be quasi co-located Rx beams. The first UE may perform the channel sensing using the Rx beam of the first UE because the first UE may know that the second UE will perform the intended transmission using the same Tx beam that was used to transmit the IUC request. The first UE may determine the preferred resources or the non-preferred resources, from the perspective of the first UE, based at least in part on the channel sensing using the Rx beam of the first UE.

As shown by reference number 1304, the first UE may transmit, to the second UE, the IUC information that indicates the preferred resources or the non-preferred resources for the intended transmission of the second UE. The IUC information may be based at least in part on the channel sensing by the first UE. The second UE may receive the IUC information from the first UE.

As shown by reference number 1306, the second UE may transmit, to a third UE (e.g., a second Rx UE) and based at least in part on the IUC information, the intended transmission using the Tx beam of the second UE. The third UE may be an intended recipient of the intended transmission. The second UE may transmit the intended transmission using the preferred resources of the first UE, as indicated by the IUC information. The second UE may transmit the intended transmission by not using the non-preferred resources, as indicated by the IUC information. As a result, the intended transmission of the second UE using the Tx beam may not negatively affect the first UE.

In some aspects, transmit resources of the intended transmission of the second UE may be based at least in part on the IUC information and a channel sensing by the second UE. In other words, both the first UE and the second UE may perform a channel sensing. The channel sensing by the second UE may be based at least in part on the Tx beam of the second UE used to transmit the IUC request and the intended transmission.

In some aspects, the IUC request may not indicate which Rx beam of the first UE is to be used for performing the channel sensing. Rather, the first UE may assume that the Rx beam of the first UE used to receive the IUC request should be the same Rx beam used for performing the channel sensing, which may be based at least in part on an assumption by the first UE that the second UE will transmit the intended transmission using the same Tx beam of the second UE used to transmit the IUC request. In some aspects, the IUC request may indicate the Rx beam of the first UE that is to be used for performing the channel sensing. In other words, the IUC request may indicate which specific Rx beam of the first UE should be used for performing the channel sensing, but this approach would increase a quantity of bits signaled in the IUC request.

In some aspects, the Tx beam that the second UE may use for the intended transmission may be implicitly indicated to the first UE, which may correspond to the first UE's Rx beam for which the second UE requests the IUC information. The second UE may transmit the IUC request to the first UE using the Tx beam, spatial relation, or TCI state that the second UE will use to perform the intended transmission. The Tx beam that the second UE uses to transmit the IUC request may be quasi co-located (e.g., Type D) with the Tx beam that the second UE will use to perform the intended transmission. When the first UE is the receiver of the second UE's intended transmission, the second UE may transmit the IUC request to the first UE using the same Tx beam, spatial relation, or TCI state that the second UE will use to transmit the intended transmission to the first UE. When the second UE is using both the IUC information and its own channel sensing result, the second UE may perform the channel sensing using the Tx beam, spatial relation, or TCI state that the second UE will use to perform the intended transmission.

In some aspects, the first UE may use the Rx beam of the first UE used to receive the IUC request to perform the channel sensing, where the channel sensing may enable the first UE to determine the preferred resources and/or the non-preferred resources. The first UE may use the Rx beam, spatial relation, or TCI state that the first UE used to receive the IUC request from the second UE to perform the channel sensing and to determine the preferred resources and/or the non-preferred resources for the second UE's intended transmission. The Rx beam that the first UE uses to perform the channel sensing may be quasi co-located (e.g., Type D) with the Rx beam that the first UE used to receive the IUC request.

In some aspects, when the IUC request does not indicate which Rx beam, spatial relation, or TCI state the first UE should use to perform the channel sensing, the first UE may use the Rx beam, spatial relation, or TCI state that the first UE used to receive the IUC request from the second UE to perform the channel sensing and to determine the preferred resources and/or the non-preferred resources for the second UE's intended transmission. When the IUC request does indicate which Rx beam, spatial relation, or TCI state the first UE should use to perform the channel sensing, the first UE may use the indicated Rx beam to perform the channel sensing and to determine the preferred resources and/or the non-preferred resources for the second UE's intended transmission.

As indicated above, FIG. 13 is provided as an example. Other examples may differ from what is described with regard to FIG. 13.

Figure 14:
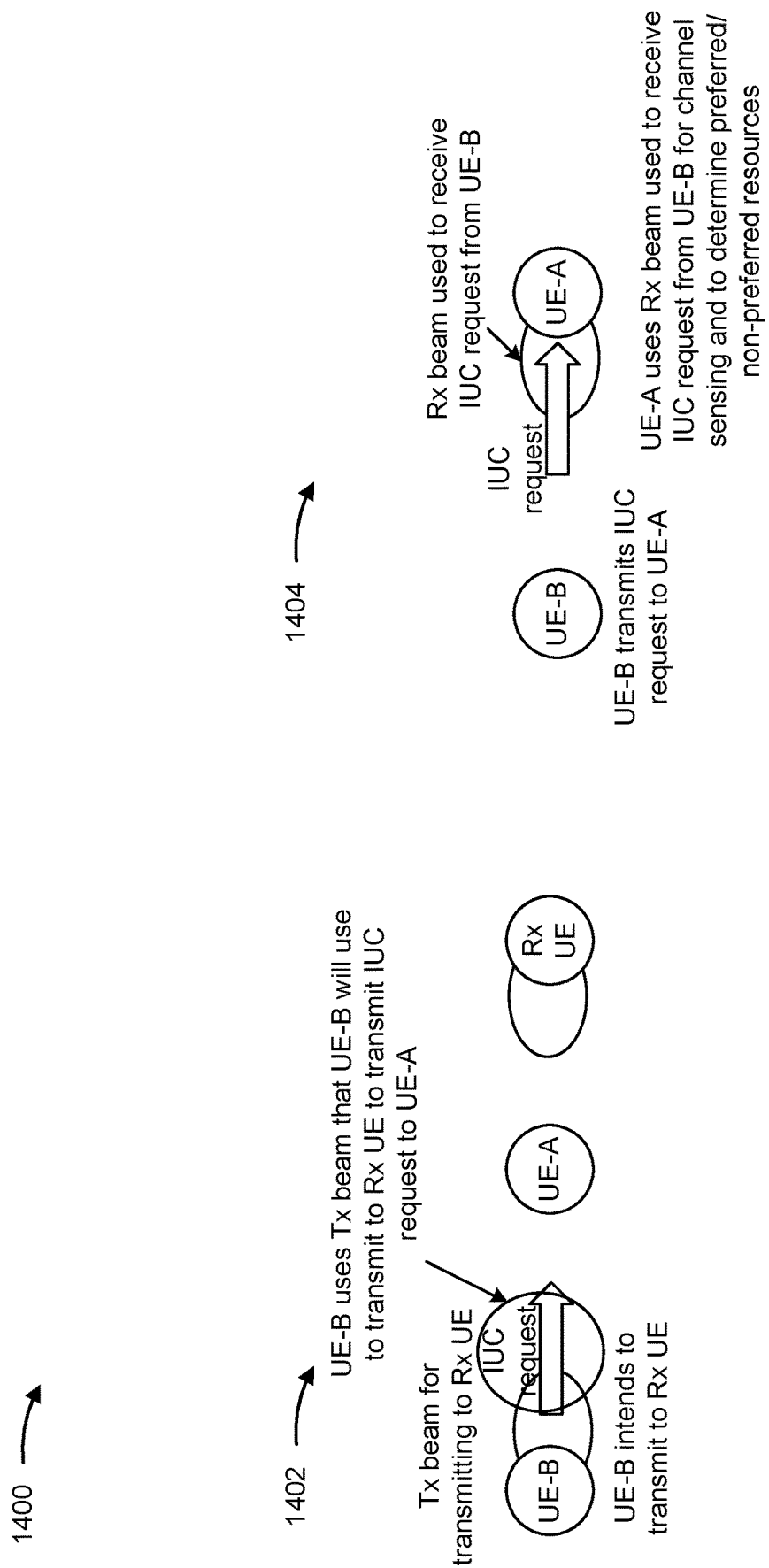

FIG. 14 is a diagram illustrating an example 1400 associated with transmitting IUC information based at least in part on beamforming, in accordance with the present disclosure.

As shown by reference number 1402, a second UE (e.g., a Tx UE or UE-B) may intend to transmit an intended transmission to a third UE (e.g., a second Rx UE). The second UE may intend to use a Tx beam (e.g., an intended Tx beam) of the second UE for transmitting the intended transmission to the third UE. The second UE may transmit an IUC request to a first UE (e.g., a first Rx UE). The second UE may use the Tx beam of the second UE, that the second UE will use to transmit to the third UE, to transmit the IUC request to the first UE. In other words, the second UE may transmit the IUC request using the same Tx beam to be used by the second UE for transmitting to the third UE.

As shown by reference number 1404, the second UE may transmit the IUC request to the first UE using the Tx beam of the second UE. The first UE may use an Rx beam of the first UE to receive the IUC request from the second UE. The Rx beam of the first UE may be associated with the Tx beam of the second UE, such that the Rx beam of the first UE and the Tx beam of the second UE may form a beam pair. The second UE may use the Rx beam used to receive the IUC request from the second UE for channel sensing and to determine preferred resources and/or non-preferred resources. In other words, depending on the Rx beam of the first UE used to receive the IUC request, the first UE may know which Rx beam to use when performing the channel sensing and determining the preferred resources and/or non-preferred resources. The first UE may receive the IUC request and perform the channel sensing using the same Rx beam.

As indicated above, FIG. 14 is provided as an example. Other examples may differ from what is described with regard to FIG. 14.

Figure 15:
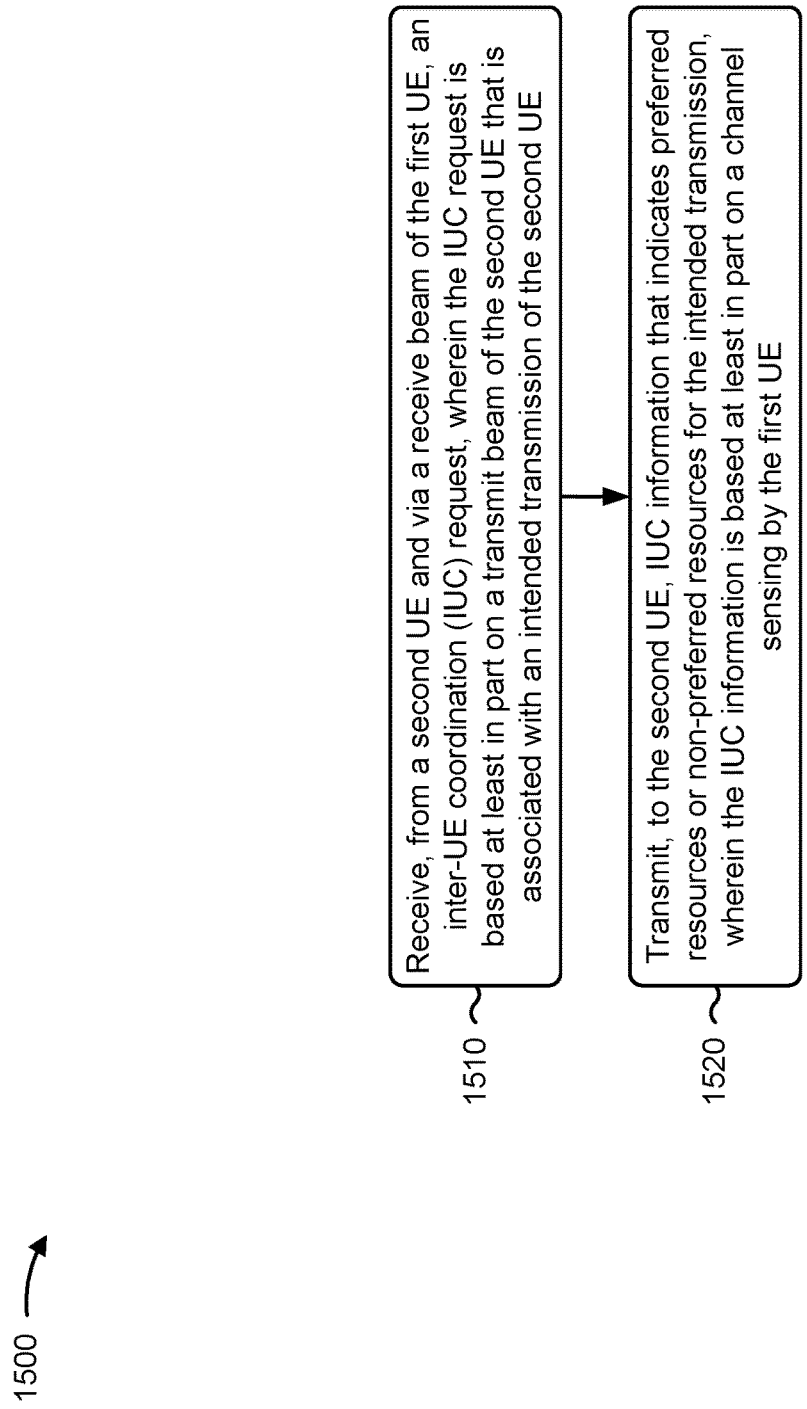
FIGS. 15-16 are diagrams illustrating example processes associated with transmitting IUC information based at least in part on beamforming, in accordance with the present disclosure.

FIG. 15 is a diagram illustrating an example process 1500 performed, for example, by a first UE, in accordance with the present disclosure. Example process 1500 is an example where the first UE (e.g., UE 120) performs operations associated with transmitting IUC information based at least in part on beamforming.

As shown in FIG. 15, in some aspects, process 1500 may include receiving, from a second UE and via an Rx beam of the first UE, an IUC request, wherein the IUC request is based at least in part on a Tx beam of the second UE that is associated with an intended transmission of the second UE (block 1510). For example, the first UE (e.g., using reception component 1702, depicted in FIG. 17) may receive, from a second UE and via an Rx beam of the first UE, an IUC request, wherein the IUC request is based at least in part on a Tx beam of the second UE that is associated with an intended transmission of the second UE, as described above.

As further shown in FIG. 15, in some aspects, process 1500 may include transmitting, to the second UE, IUC information that indicates preferred resources or non-preferred resources for the intended transmission, wherein the IUC information is based at least in part on a channel sensing by the first UE (block 1520). For example, the first UE (e.g., using transmission component 1704, depicted in FIG. 17) may transmit, to the second UE, IUC information that indicates preferred resources or non-preferred resources for the intended transmission, wherein the IUC information is based at least in part on a channel sensing by the first UE, as described above.

Process 1500 may include additional aspects, such as any single aspect or any combination of aspects described below and/or in connection with one or more other processes described elsewhere herein.

In a first aspect, the Rx beam of the first UE is associated with a spatial relation or a TCI state or a spatial filter.

In a second aspect, alone or in combination with the first aspect, the Tx beams of the second UE used for transmitting the IUC request and for transmitting the intended transmission are quasi co-located Tx beams.

In a third aspect, alone or in combination with one or more of the first and second aspects, transmit resources of the intended transmission are based at least in part on the IUC information and a channel sensing by the second UE, wherein the channel sensing by the second UE is based at least in part on the Tx beam of the second UE used to transmit the intended transmission.

In a fourth aspect, alone or in combination with one or more of the first through third aspects, Rx beams of the first UE used for channel sensing and for receiving the IUC request are quasi co-located Rx beams.

In a fifth aspect, alone or in combination with one or more of the first through fourth aspects, the IUC request does not indicate which Rx beam of the first UE is to be used for performing the channel sensing.

In a sixth aspect, alone or in combination with one or more of the first through fifth aspects, the IUC request indicates the Rx beam of the first UE that is to be used for performing the channel sensing.

In a seventh aspect, alone or in combination with one or more of the first through sixth aspects, the intended transmission by the second UE is to a third UE, wherein the third UE is an intended recipient of the intended transmission.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
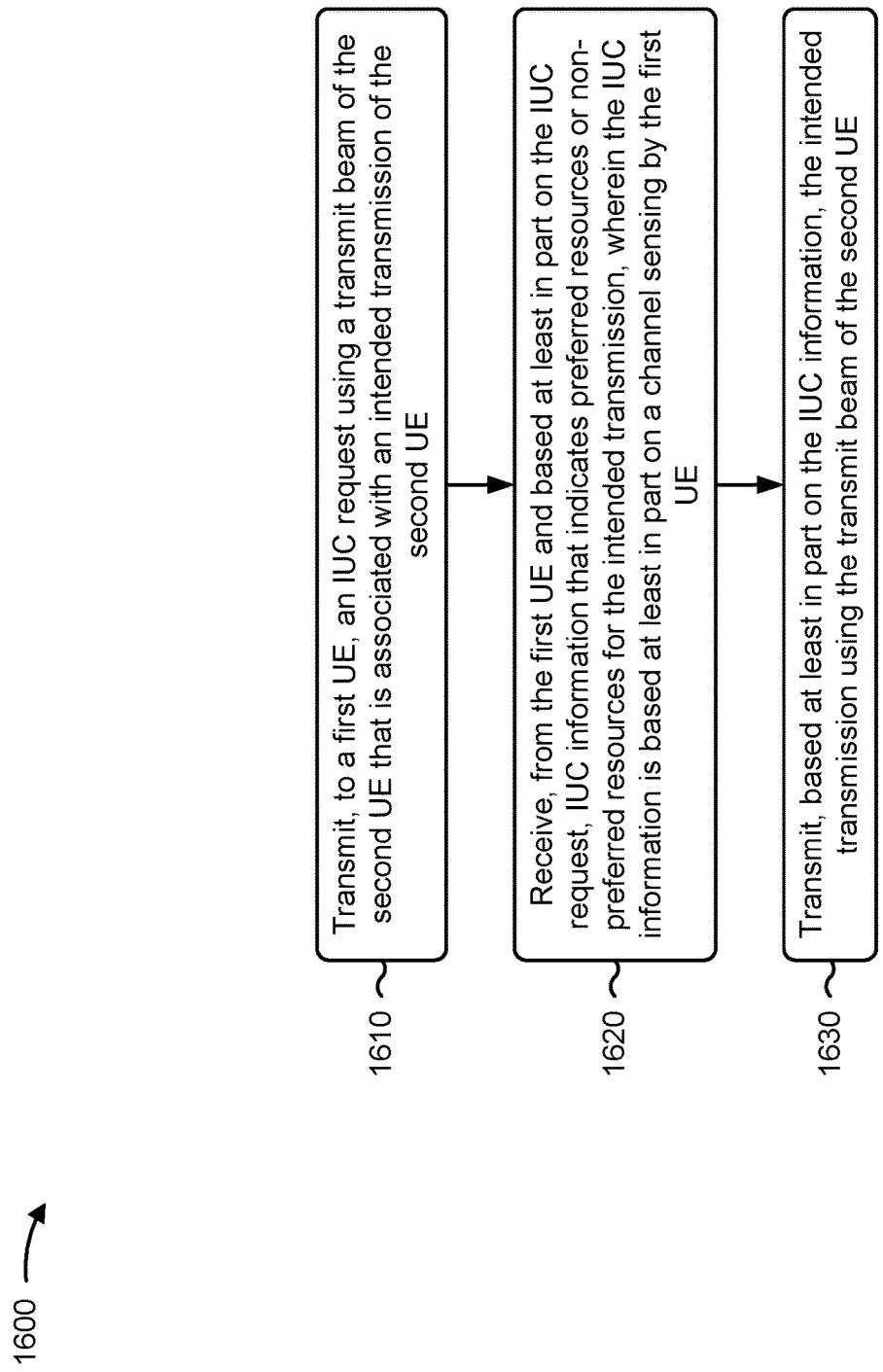

FIG. 16 is a diagram illustrating an example process 1600 performed, for example, by a second UE, in accordance with the present disclosure. Example process 1600 is an example where the second UE (e.g., UE 120) performs operations associated with transmitting IUC information based at least in part on beamforming.

As shown in FIG. 16, in some aspects, process 1600 may include transmitting, to a first UE, an IUC request using a Tx beam of the second UE that is associated with an intended transmission of the second UE (block 1610). For example, the second UE (e.g., using transmission component 1804, depicted in FIG. 18) may transmit, to a first UE, an IUC request using a Tx beam of the second UE that is associated with an intended transmission of the second UE, as described above.

As further shown in FIG. 16, in some aspects, process 1600 may include receiving, from the first UE and based at least in part on the IUC request, IUC information that indicates preferred resources or non-preferred resources for the intended transmission, wherein the IUC information is based at least in part on a channel sensing by the first UE (block 1620). For example, the second UE (e.g., using reception component 1802, depicted in FIG. 18) may receive, from the first UE and based at least in part on the IUC request, IUC information that indicates preferred resources or non-preferred resources for the intended transmission, wherein the IUC information is based at least in part on a channel sensing by the first UE, as described above.

As further shown in FIG. 16, in some aspects, process 1600 may include transmitting, based at least in part on the IUC information, the intended transmission using the Tx beam of the second UE (block 1630). For example, the second UE (e.g., using transmission component 1804, depicted in FIG. 18) may transmit, based at least in part on the IUC information, the intended transmission using the Tx beam of the second UE, as described above.

Process 1600 may include additional aspects, such as any single aspect or any combination of aspects described below and/or in connection with one or more other processes described elsewhere herein.

In a first aspect, the Tx beam of the second UE is associated with a spatial relation or a TCI state or a spatial filter.

In a second aspect, alone or in combination with the first aspect, the Tx beams of the second UE used for transmitting the IUC request and for transmitting the intended transmission are quasi co-located Tx beams.

In a third aspect, alone or in combination with one or more of the first and second aspects, transmit resources of the intended transmission are based at least in part on the IUC information and a channel sensing by the second UE, wherein the channel sensing by the second UE is based at least in part on the Tx beam of the second UE used to transmit the intended transmission.

In a fourth aspect, alone or in combination with one or more of the first through third aspects, Rx beams of the first UE used for the channel sensing and for receiving the IUC request are quasi co-located Rx beams.

In a fifth aspect, alone or in combination with one or more of the first through fourth aspects, the IUC request does not indicate which Rx beam of the first UE is to be used by the first UE for performing the channel sensing.

In a sixth aspect, alone or in combination with one or more of the first through fifth aspects, the IUC request indicates an Rx beam of the first UE that is to be used for performing the channel sensing.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
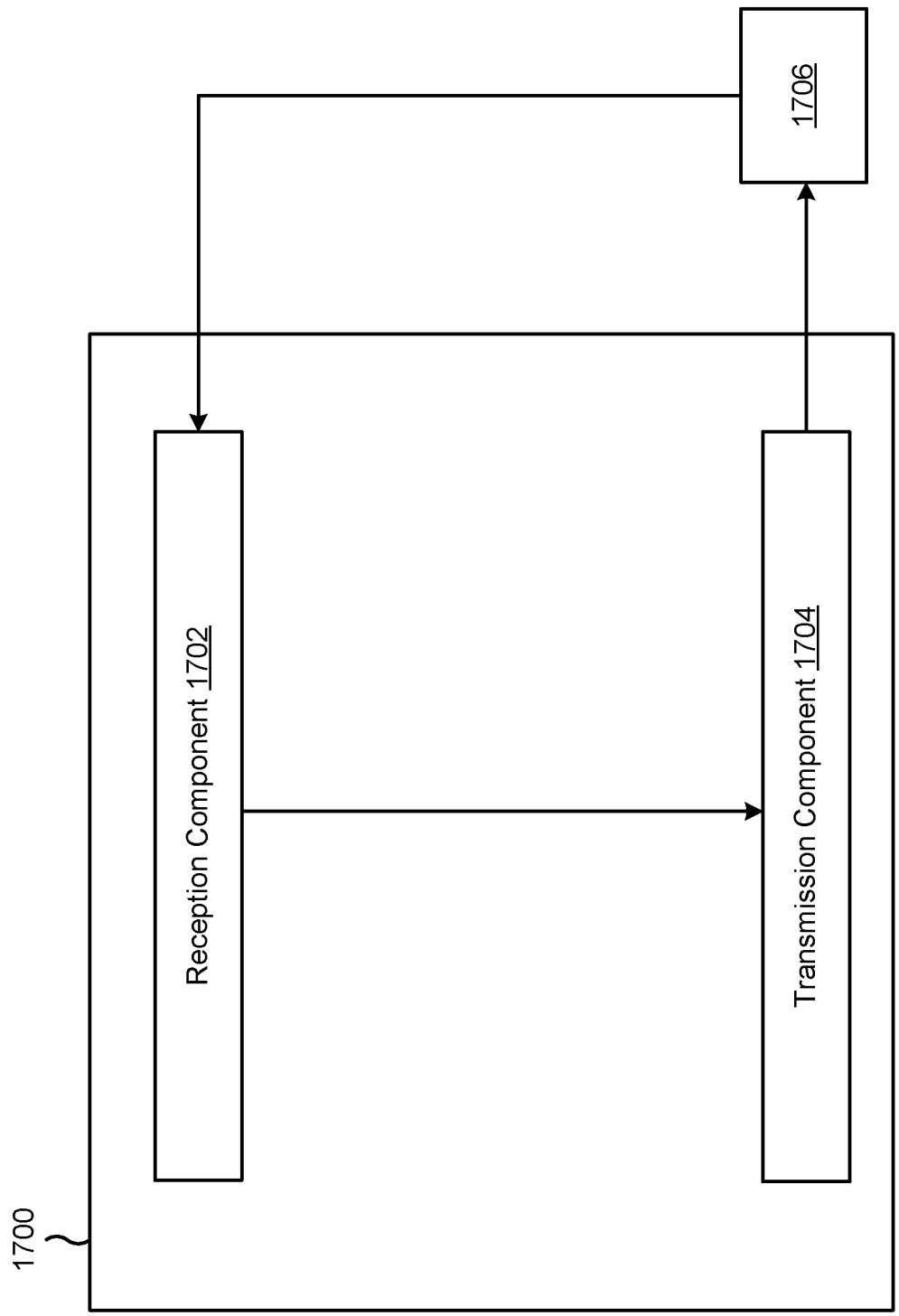
FIGS. 17-18 are diagrams of example apparatuses for wireless communication, in accordance with the present disclosure.

FIG. 17 is a diagram of an example apparatus 1700 for wireless communication, in accordance with the present disclosure. The apparatus 1700 may be a first UE, or a first UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704.

In some aspects, the apparatus 1700 may be configured to perform one or more operations described herein in connection with FIGS. 13-14. Additionally, or alternatively, the apparatus 1700 may be configured to perform one or more processes described herein, such as process 1500 of FIG. 15. In some aspects, the apparatus 1700 and/or one or more components shown in FIG. 17 may include one or more components of the first UE described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the first UE described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the first UE described in connection with FIG. 2. In some aspects, the transmission component 1704 may be co-located with the reception component 1702 in a transceiver.

The reception component 1702 may receive, from a second UE and via an Rx beam of the first UE, an IUC request, wherein the IUC request is based at least in part on a Tx beam of the second UE that is associated with an intended transmission of the second UE. The transmission component 1704 may transmit, to the second UE, IUC information that indicates preferred resources or non-preferred resources for the intended transmission, wherein the IUC information is based at least in part on a channel sensing by the first UE.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
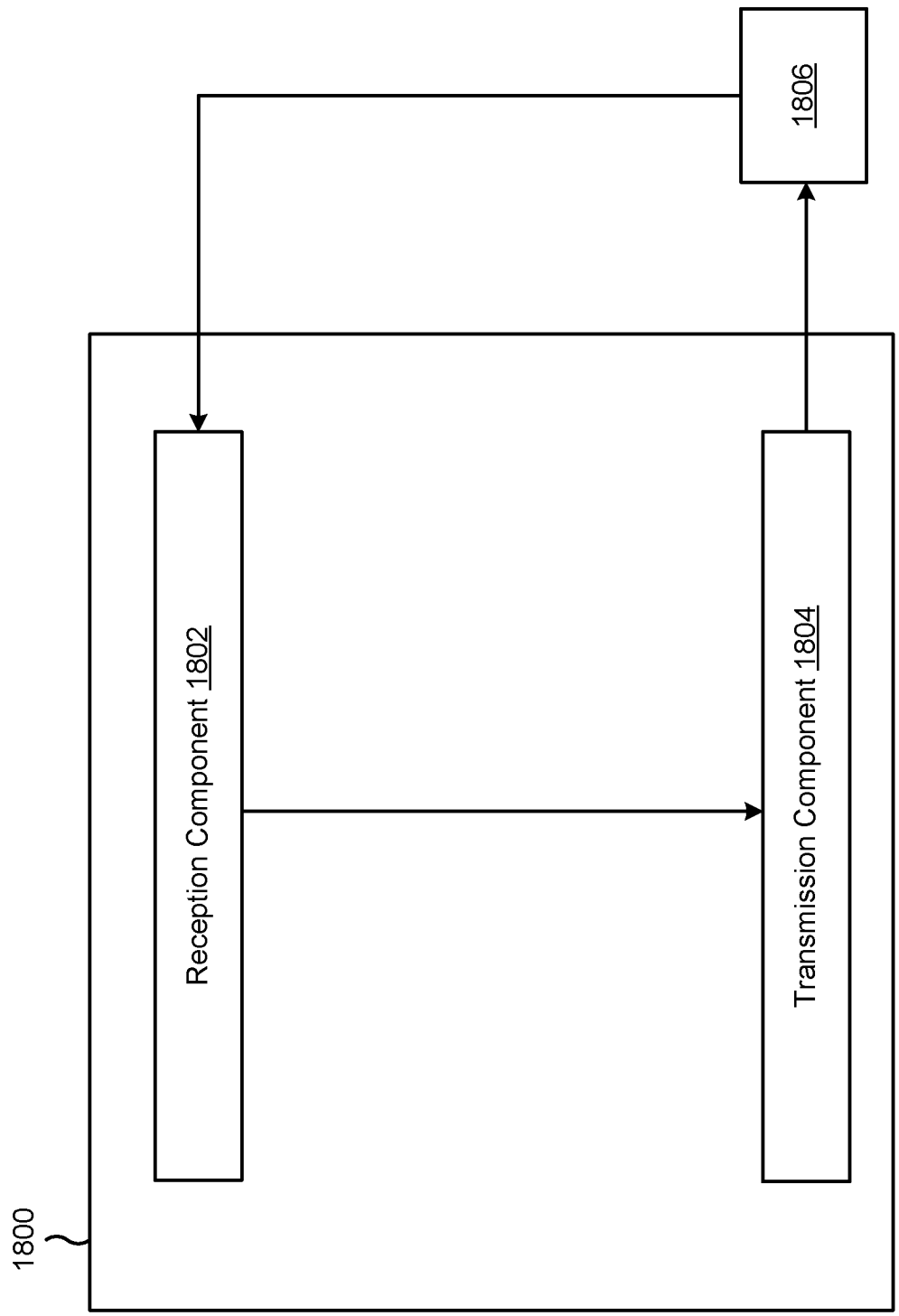

FIG. 18 is a diagram of an example apparatus 1800 for wireless communication, in accordance with the present disclosure. The apparatus 1800 may be a second UE, or a second UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804.

In some aspects, the apparatus 1800 may be configured to perform one or more operations described herein in connection with FIGS. 13-14. Additionally, or alternatively, the apparatus 1800 may be configured to perform one or more processes described herein, such as process 1600 of FIG. 16. In some aspects, the apparatus 1800 and/or one or more components shown in FIG. 18 may include one or more components of the second UE described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the second UE described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the second UE described in connection with FIG. 2. In some aspects, the transmission component 1804 may be co-located with the reception component 1802 in a transceiver.

The transmission component 1804 may transmit, to a first UE, an IUC request using a Tx beam of the second UE that is associated with an intended transmission of the second UE. The reception component 1802 may receive, from the first UE and based at least in part on the IUC request, IUC information that indicates preferred resources or non-preferred resources for the intended transmission, wherein the IUC information is based at least in part on a channel sensing by the first UE. The transmission component 1804 may transmit, based at least in part on the IUC information, the intended transmission using the Tx beam of the second UE.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a first user equipment (UE), comprising: receiving, from a second UE and via a receive beam of the first UE, an inter-UE coordination (IUC) request, wherein the IUC request is based at least in part on a transmit beam of the second UE that is associated with an intended transmission of the second UE; and transmitting, to the second UE, IUC information that indicates preferred resources or non-preferred resources for the intended transmission, wherein the IUC information is based at least in part on a channel sensing by the first UE.

Aspect 2: The method of Aspect 1, wherein the receive beam of the first UE is associated with a spatial relation or a transmission configuration indication state or a spatial filter.

Aspect 3: The method of any of Aspects 1 through 2, wherein the transmit beams of the second UE used for transmitting the IUC request and for transmitting the intended transmission are quasi co-located transmit beams.

Aspect 4: The method of any of Aspects 1 through 3, wherein transmit resources of the intended transmission are based at least in part on the IUC information and a channel sensing by the second UE, wherein the channel sensing by the second UE is based at least in part on the transmit beam of the second UE used to transmit the intended transmission.

Aspect 5: The method of any of Aspects 1 through 4, wherein receive beams of the first UE used for channel sensing and for receiving the IUC request are quasi co-located receive beams.

Aspect 6: The method of any of Aspects 1 through 5, wherein the IUC request does not indicate which receive beam of the first UE is to be used for performing the channel sensing.

Aspect 7: The method of any of Aspects 1 through 6, wherein the IUC request indicates the receive beam of the first UE that is to be used for performing the channel sensing.

Aspect 8: The method of any of Aspects 1 through 7, wherein the intended transmission by the second UE is to a third UE, wherein the third UE is an intended recipient of the intended transmission.

Aspect 9: A method of wireless communication performed by a second user equipment (UE), comprising: transmitting, to a first UE, an inter-UE coordination (IUC) request using a transmit beam of the second UE that is associated with an intended transmission of the second UE; receiving, from the first UE and based at least in part on the IUC request, IUC information that indicates preferred resources or non-preferred resources for the intended transmission, wherein the IUC information is based at least in part on a channel sensing by the first UE; and transmitting, based at least in part on the IUC information, the intended transmission using the transmit beam of the second UE.

Aspect 10: The method of Aspect 9, wherein the transmit beam of the second UE is associated with a spatial relation or a transmission configuration indication state or a spatial filter.

Aspect 11: The method of any of Aspects 9 through 10, wherein the transmit beams of the second UE used for transmitting the IUC request and for transmitting the intended transmission are quasi co-located transmit beams.

Aspect 12: The method of any of Aspects 9 through 11, wherein transmit resources of the intended transmission are based at least in part on the IUC information and a channel sensing by the second UE, wherein the channel sensing by the second UE is based at least in part on the transmit beam of the second UE used to transmit the intended transmission.

Aspect 13: The method of any of Aspects 9 through 12, wherein receive beams of the first UE used for the channel sensing and for receiving the IUC request are quasi co-located receive beams.

Aspect 14: The method of any of Aspects 9 through 13, wherein the IUC request does not indicate which receive beam of the first UE is to be used by the first UE for performing the channel sensing.

Aspect 15: The method of any of Aspects 9 through 14, wherein the IUC request indicates a receive beam of the first UE that is to be used for performing the channel sensing.

Aspect 16: An apparatus for wireless communication at a device, comprising a processor; memory coupled with the processor; and instructions stored in the memory and executable by the processor to cause the apparatus to perform the method of one or more of Aspects 1-8.

Aspect 17: A device for wireless communication, comprising a memory and one or more processors coupled to the memory, the one or more processors configured to perform the method of one or more of Aspects 1-8.

Aspect 18: An apparatus for wireless communication, comprising at least one means for performing the method of one or more of Aspects 1-8.

Aspect 19: A non-transitory computer-readable medium storing code for wireless communication, the code comprising instructions executable by a processor to perform the method of one or more of Aspects 1-8.

Aspect 20: A non-transitory computer-readable medium storing a set of instructions for wireless communication, the set of instructions comprising one or more instructions that, when executed by one or more processors of a device, cause the device to perform the method of one or more of Aspects 1-8.

Aspect 21: An apparatus for wireless communication at a device, comprising a processor; memory coupled with the processor; and instructions stored in the memory and executable by the processor to cause the apparatus to perform the method of one or more of Aspects 1-8.

Aspect 22: A device for wireless communication, comprising a memory and one or more processors coupled to the memory, the one or more processors configured to perform the method of one or more of Aspects 9-15.

Aspect 23: An apparatus for wireless communication, comprising at least one means for performing the method of one or more of Aspects 9-15.

Aspect 24: A non-transitory computer-readable medium storing code for wireless communication, the code comprising instructions executable by a processor to perform the method of one or more of Aspects 9-15.

Aspect 25: A non-transitory computer-readable medium storing a set of instructions for wireless communication, the set of instructions comprising one or more instructions that, when executed by one or more processors of a device, cause the device to perform the method of one or more of Aspects 9-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   a memory; and
   one or more processors, coupled to the memory, configured to:
   receive, from a second UE and via a receive beam of the first UE, a request for inter-UE coordination (IUC) information, wherein the request is based at least in part on a transmit beam of the second UE that is associated with an intended transmission of the second UE; and
   transmit, to the second UE and in response to the request, the IUC information that indicates preferred resources or non-preferred resources for the intended transmission of the second UE, wherein the preferred resources or the non-preferred resources for the intended transmission are based at least in part on a channel sensing performed by the first UE.

2. The apparatus of claim 1, wherein the receive beam of the first UE is associated with a spatial relation or a transmission configuration indication state or a spatial filter.

3. The apparatus of claim 1, wherein the transmit beam of the second UE used for transmitting the request and a transmit beam of the second UE used for transmitting the intended transmission are quasi co-located transmit beams.

4. The apparatus of claim 1, wherein transmit resources of the intended transmission are based at least in part on the IUC information and a channel sensing by the second UE, wherein the channel sensing by the second UE is based at least in part on the transmit beam of the second UE used to transmit the intended transmission.

5. The apparatus of claim 1, wherein receive beams of the first UE used for the channel sensing and for receiving the request are quasi co-located receive beams.

6. The apparatus of claim 1, wherein the request does not indicate which receive beam of the first UE is to be used for performing the channel sensing.

7. The apparatus of claim 1, wherein the request indicates the receive beam of the first UE that is to be used for performing the channel sensing.

8. The apparatus of claim 1, wherein the intended transmission by the second UE is to a third UE, wherein the third UE is an intended recipient of the intended transmission.

9. An apparatus for wireless communication at a second user equipment (UE), comprising:
   a memory; and
   one or more processors, coupled to the memory, configured to:
   transmit, to a first UE, a request for inter-UE coordination (IUC) information using a transmit beam of the second UE that is associated with an intended transmission of the second UE;
   receive, from the first UE and in response to the request, the IUC information that indicates preferred resources or non-preferred resources for the intended transmission of the second UE, wherein the preferred resources or the non-preferred resources for the intended transmission are based at least in part on a channel sensing performed by the first UE; and
   transmit, based at least in part on the IUC information, the intended transmission using the transmit beam of the second UE.

10. The apparatus of claim 9, wherein the transmit beam of the second UE is associated with a spatial relation or a transmission configuration indication state or a spatial filter.

11. The apparatus of claim 9, wherein the transmit beam of the second UE used for transmitting the request and a transmit beam of the second UE used for transmitting the intended transmission are quasi co-located transmit beams.

12. The apparatus of claim 9, wherein transmit resources of the intended transmission are based at least in part on the IUC information and a channel sensing by the second UE, wherein the channel sensing by the second UE is based at least in part on the transmit beam of the second UE used to transmit the intended transmission.

13. The apparatus of claim 9, wherein receive beams of the first UE used for the channel sensing and for receiving the request are quasi co-located receive beams.

14. The apparatus of claim 9, wherein the request does not indicate which receive beam of the first UE is to be used by the first UE for performing the channel sensing.

15. The apparatus of claim 9, wherein the request indicates a receive beam of the first UE that is to be used for performing the channel sensing.

16. A method of wireless communication performed by a first user equipment (UE), comprising:
   receiving, from a second UE and via a receive beam of the first UE, a request for inter-UE coordination (IUC) information, wherein the request is based at least in part on a transmit beam of the second UE that is associated with an intended transmission of the second UE; and transmitting, to the second UE and in response to the request, the IUC information that indicates preferred resources or non-preferred resources for the intended transmission of the second UE, wherein the preferred resources or the non-preferred resources for the intended transmission are based at least in part on a channel sensing performed by the first UE.

17. The method of claim 16, wherein the receive beam of the first UE is associated with a spatial relation or a transmission configuration indication state or a spatial filter.

18. The method of claim 16, wherein the transmit beam of the second UE used for transmitting the request and a transmit beam of the second UE used for transmitting the intended transmission are quasi co-located transmit beams.

19. The method of claim 16, wherein transmit resources of the intended transmission are based at least in part on the IUC information and a channel sensing by the second UE, wherein the channel sensing by the second UE is based at least in part on the transmit beam of the second UE used to transmit the intended transmission.

20. The method of claim 16, wherein receive beams of the first UE used for the channel sensing and for receiving the request are quasi co-located receive beams.

21. The method of claim 16, wherein the request does not indicate which receive beam of the first UE is to be used for performing the channel sensing.

22. The method of claim 16, wherein the request indicates the receive beam of the first UE that is to be used for performing the channel sensing.

23. The method of claim 16, wherein the intended transmission by the second UE is to a third UE, wherein the third UE is an intended recipient of the intended transmission.

24. A method of wireless communication performed by a second user equipment (UE), comprising:

transmitting, to a first UE a request for inter-UE coordination (IUC) information using a transmit beam of the second UE that is associated with an intended transmission of the second UE;

receiving, from the first UE and in response to the request, the IUC information that indicates preferred resources or non-preferred resources for the intended transmission, wherein the preferred resources or the non-preferred resources for the intended transmission are based at least in part on a channel sensing performed by the first UE; and transmitting, based at least in part on the IUC information, the intended transmission using the transmit beam of the second UE.

25. The method of claim 24, wherein the transmit beam of the second UE is associated with a spatial relation or a transmission configuration indication state or a spatial filter.

26. The method of claim 24, wherein the transmit beam of the second UE used for transmitting the request and a transmit beam of the second UE used for transmitting the intended transmission are quasi co-located transmit beams.

27. The method of claim 24, wherein transmit resources of the intended transmission are based at least in part on the IUC information and a channel sensing by the second UE, wherein the channel sensing by the second UE is based at least in part on the transmit beam of the second UE used to transmit the intended transmission.

28. The method of claim 24, wherein receive beams of the first UE used for the channel sensing and for receiving the request are quasi co-located receive beams.

29. The method of claim 24, wherein the request does not indicate which receive beam of the first UE is to be used by the first UE for performing the channel sensing.

30. The method of claim 24, wherein the request indicates a receive beam of the first UE that is to be used for performing the channel sensing.

* * * * *